United States Patent [19]

Ohe et al.

[11] Patent Number: 4,811,330
[45] Date of Patent: Mar. 7, 1989

[54] AUTOMOBILE ANTENNA SYSTEM

[75] Inventors: Junzo Ohe; Hiroshi Kondo, both of Aichi, Japan

[73] Assignee: Toyota Jidosha Kabushiki Kaisha, Toyota, Japan

[21] Appl. No.: 798,024

[22] Filed: Nov. 14, 1985

[30] Foreign Application Priority Data

| Nov. 15, 1984 | [JP] | Japan | 59-242097 |
| Nov. 27, 1984 | [JP] | Japan | 59-251243 |
| Nov. 28, 1984 | [JP] | Japan | 59-252285 |
| Dec. 7, 1984 | [JP] | Japan | 59-258950 |
| Jun. 28, 1985 | [JP] | Japan | 60-143094 |
| Jun. 28, 1985 | [JP] | Japan | 60-143089 |

[51] Int. Cl.$^4$ .............. H04B 7/08; H04B 1/10
[52] U.S. Cl. .................. 455/277; 455/278; 455/297; 343/712
[58] Field of Search ............... 455/277–279, 455/345, 52, 65, 133–135, 206, 297; 343/893, 713, 725, 728, 711, 712

[56] References Cited

U.S. PATENT DOCUMENTS

| 3,916,413 | 10/1975 | Davis. |  |
| 4,370,522 | 1/1983 | Takeda et al. | 343/711 |
| 4,499,606 | 2/1985 | Rambo | 455/277 |
| 4,566,133 | 1/1986 | Rambo | 455/277 |
| 4,633,519 | 12/1986 | Gotoh et al. | 455/277 |
| 4,707,701 | 11/1987 | Ohe et al. | 343/712 |
| 4,717,920 | 1/1988 | Ohe et al. | 343/712 |
| 4,717,921 | 1/1988 | Ohe et al. | 343/712 |
| 4,717,922 | 1/1988 | Ohe et al. | 343/712 |
| 4,723,127 | 2/1988 | Ohe et al. | 343/712 |
| 4,727,377 | 2/1988 | Yotsuya | 343/711 |

FOREIGN PATENT DOCUMENTS

| 1949828 | 3/1969 | Fed. Rep. of Germany. |
| 2514181 | 10/1975 | Fed. Rep. of Germany. |
| 5322418 | 3/1976 | Japan. |
| 5334826 | 5/1976 | Japan. |

OTHER PUBLICATIONS

Patent Abstracts of Japan, vol. 5, No. 125 (E-69) [797], Aug. 12, 1981; & JP-A-56 62403 (Nissan Jidosha K.K.) 28-05-1981.
Patent Abstracts of Japan, vol. 8, No. 135 (E-252) [1572], Jun. 22, 1984; & JP-A-59 44132 (Tokyo Shibaura Denki K.K.) 12-03-1984.

Primary Examiner—Robert L. Griffin
Assistant Examiner—Curtis Kuntz
Attorney, Agent, or Firm—Cushman, Darby & Cushman

[57] ABSTRACT

The present invention provides a diversity type automobile antenna system comprising a pair of high-frequency pickups for mounted on the vehicle body at one or more locations whereat surface high-frequency currents will be induced by radio or other waves with higher densities, said high-freqnency pickups being arranged such that one of said high-frequency pickups can complement the other with respect to sensitivity. The above locations on the vehicle body include the marginal edge of a closure such as trunk lid, roof or engine hook, and various connections between each adjacent vehicle portion of flat configuration such as pillars supporting the roof panel or trunk hinges. One of the high-frequency pickups are adapted to be automatically selected such that it can receive radio or other waves more sensitively.

27 Claims, 42 Drawing Sheets

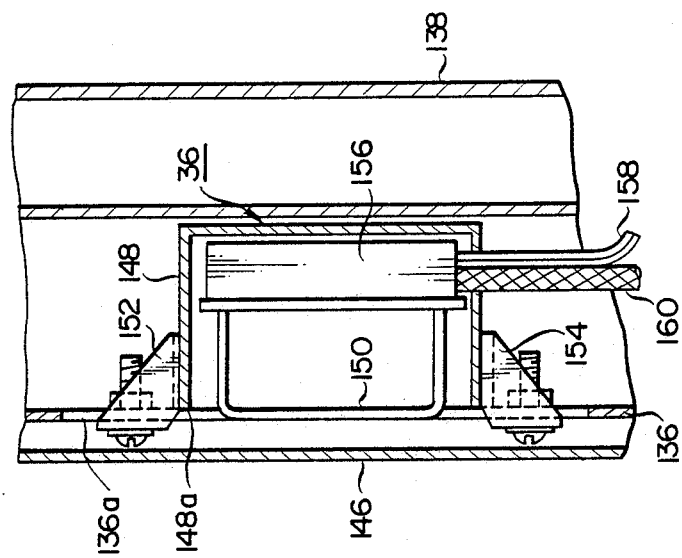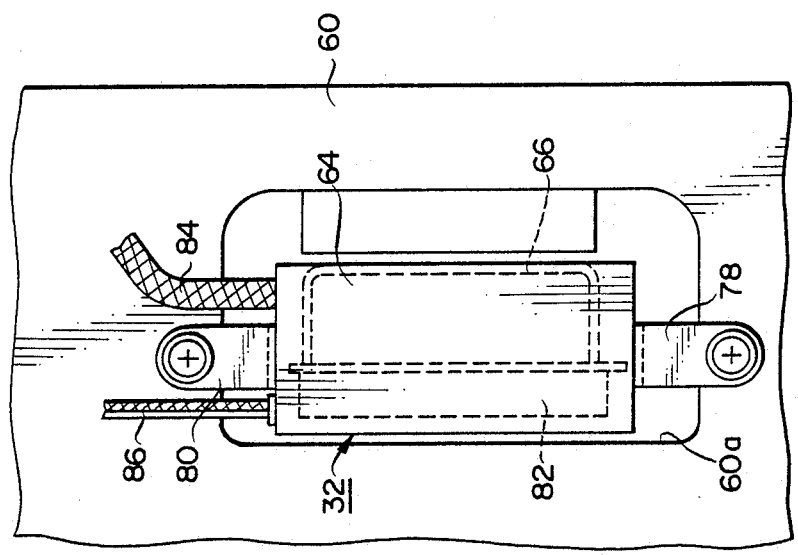

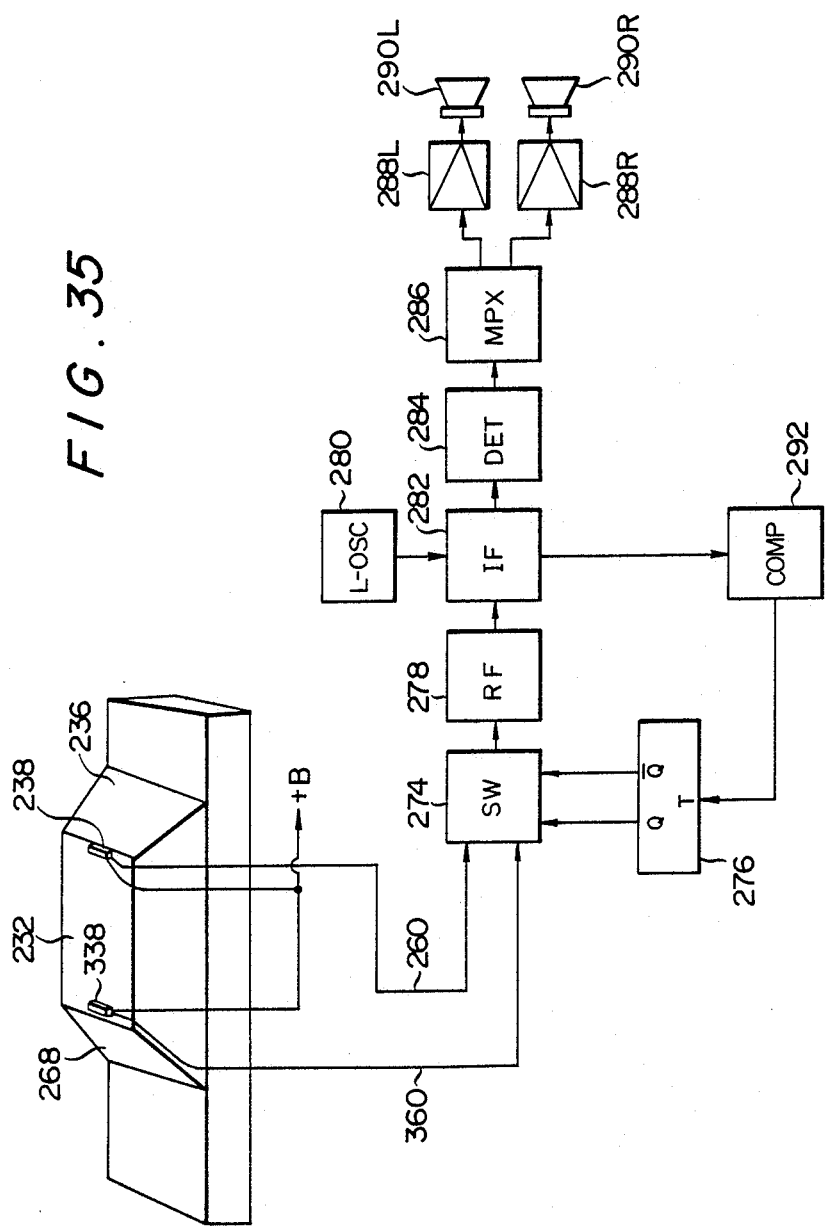

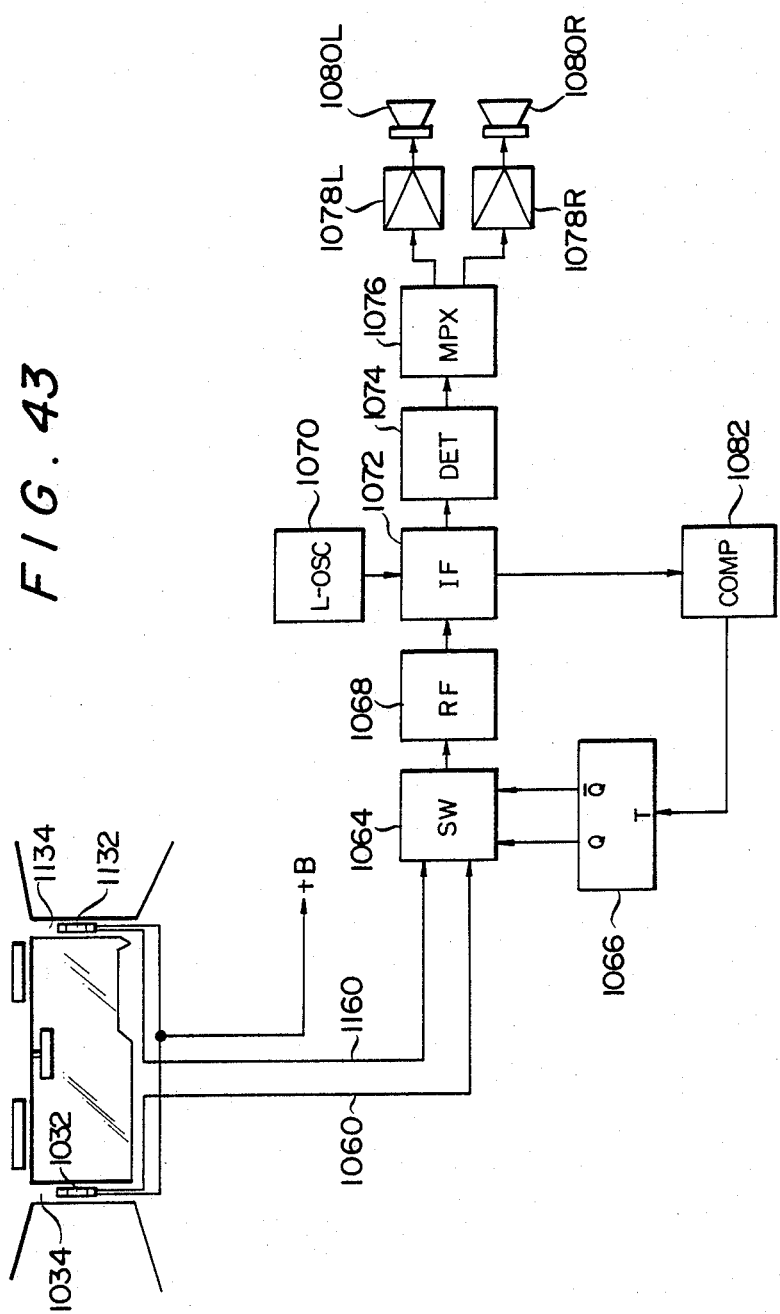

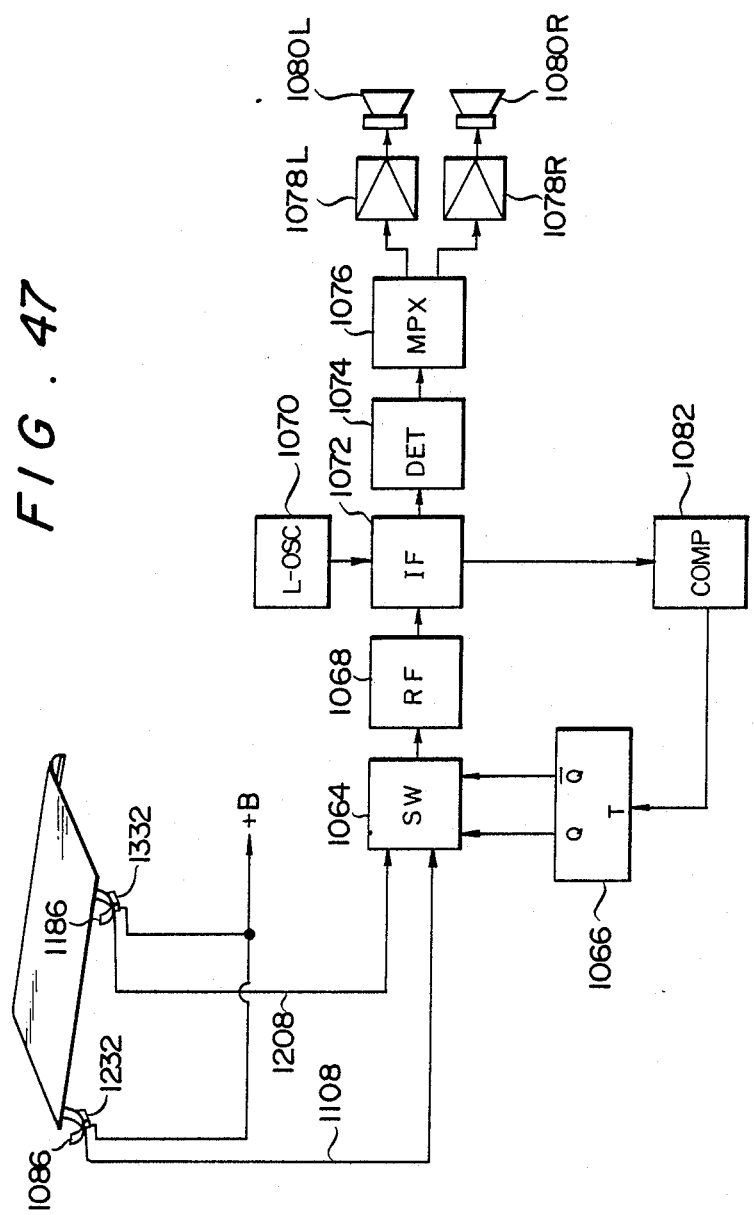

AUTOMOBILE ANTENNA SYSTEM

BACKGROUND OF THE INVENTION

1. Field of the Invention

The present invention relates to an improved antenna system for automobiles, which can efficiently detect waves received by the vehicle body and transmit the detected signals to various built-in receivers.

2. Description of the Prior Art

Antenna systems are essential for modern automobiles to positively receive various waves such as radio waves TV waves, car-telephone waves and other waves at their built-in receivers. Antenna systems also are very important for citizen band transceivers effecting the reception and transmission of waves between the automobiles and other stations.

There is generally known a pole type antenna which projects outwardly from the vehicle body and exhibits favorable reception performance. However, the pole type antenna always constituted an obstruction in vehicle body design.

The pole type antenna is actually subject to being damaged or stolen and also produces an unpleasant noise when an automobile, on which that antenna is mounted, runs at high speeds. For these reasons, it has been desired to eliminate the pole antenna.

Recently, frequency bands of broadcast and communications waves to be received by built-in receivers in automobiles have been widened. This requires a plurality of antennas mounted on an automobile to be compatible with various frequency bands. The plurality of antennas will detract from aesthetic automobile design and further provides a problem in that electrical interference between the antennas will degrade the reception performance in the antennas themselves.

Some attempts have been made to eliminate or conceal the pole type antenna. One of these attempts is that an antenna wire is applied to the rear window glass on an automobile.

Another attempt is an antenna system which is adapted to detect surface currents induced on the body of an automobile, by radio or other waves. This attempt appears to be the most positive and efficient. However, experiments always showed that such an antenna system could not advantageously be utilized.

One of the reasons why the prior art antenna system cannot effectively utilize the surface currents induced on the vehicle body by radio or other waves is that the level of the surface currents is not as would high as be expected. The prior art utilizes surface currents induced on the vehicle body at its front roof. Notwithstanding, one cannot detect surface currents at such a level, so as to be effectively utilized.

The second reason is that surface currents contain a very high proportion of noise which is due to the ignition and regulator systems of an engine. Therefore, the noise cannot be eliminated unless the engine does not operate.

One proposal to overcome the above problems is disclosed in Japanese Patent Publication No. Sho 53-22418 in which an electrically insulating member is formed on the vehicle body at such a location that surface currents flow concentrically. Surface currents are sensed directly by a sensor between the opposite ends of the insulating member. Although such an arrangement can practicably detect signals having an S/N ratio, it requires a pickup which must be mounted in a notch formed particularly in the vehicle body. This is not acceptable for mass-production.

Another proposal is disclosed in Japanese Utility Model Publication No. Sho 53-34826 in which an antenna system includes a pickup coil for detecting surface currents flowing on a pillar of the vehicle body. Although this proposal is advantageous in that the antenna system can be fully mounted within the vehicle body, it is not practical since the pickup coil must be located near the pillar in a direction perpendicular to the length thereof. Furthermore, it appears that such a pickup arrangement is not practical, since it cannot obtain antenna outputs at any practicable level.

It will be apparent from the foregoing that the prior art did not necessarily solve various problems particularly with respect to the pickup arrangement for efficiently detecting surface currents induced on the vehicle body by radio or other waves and also for obtaining a practicable level of S/N ratio. Rather, experiments showed that the antenna system utilizing surface currents on the vehicle body cannot probably be used in principle.

Moreover, the prior art pickup device is poor in directional pattern and yet tends to produce multi-path noise when it is used to receive FM radio waves belonging to VHF frequency bands since these waves are interferingly reflected by buildings and mountains.

SUMMARY OF THE INVENTION

It is therefore an object of the present invention to provide a diversity reception type automobile antenna system which can efficiently detect currents induced on the vehicle body by radio or other waves and transmit them to built-in receiver means and yet which can improve the directivity of the antenna system with less multi-path noise.

To attain the above object, the present invention provides a diversity type automobile antenna system comprising a pair of diversity reception high-frequency pickups located on the vehicle body at locations, at which surface high-frequency currents are induced with higher densities on the vehicle body by radio or other waves. The high-frequency pickups are arranged to complement each other such that one of them will automatically be selected to provide better reception.

The present invention will now be described in more detail.

Initially, the prior art antenna systems mainly intended to receive AM radio waves. Such antenna systems utilizing surface currents on the vehicle body could not obtain good characteristics of reception since the wavelength of the AM radio waves is too large. First of all, the inventors aimed at this dependency of frequency. In accordance with the present invention, thus, radio or other waves to be received are limited to waves belonging to frequency bands which are equal to and higher than FM frequency bands (normally, above 50 MHz). As a result, the automobile antenna system according to the present invention can be efficiently receive waves from surface currents induced on the vehicle body.

Secondly, the inventors aimed at the fact that surface currents are distributed on the vehicle body at various locations thereof with various different levels. Thus, the present invention provides a high-frequency pickup which is disposed on the vehicle body at such a location that the density of surface currents induced by radio or other waves is higher with less noise and positioned parallel to a direction in which the induced surface currents flow on the vehicle body. In this manner, the antenna system can more efficiently receive radio or other waves from the surface currents on the vehicle body.

Although such a location on the vehicle body will be described in detail with respect to preferred embodiments of the present invention, it is briefly said herein that it includes the marginal edge portion of trunk lid, roof, engine hood or the like and various flat connections of the vehicle body, for example, at a pillar supporting the roof, trunk hinges and others.

The present invention is further characterized by a space diversity system comprising a pair of high-frequency pickups arranged to complement each other such that one of the pickups having a higher sensitivity will be selected for reception. Thus, an antenna system is provided which can be improved in directional pattern with less multi-path noise.

The diversity type automobile antenna system may preferably be constructed in the following forms:

A first embodiment of the present invention is characterized by a first high-frequency pickup located on the right or left side of the rear roof of the vehicle body adjacent to its rearward edge and extending longitudinally and a second high-frequency pickup disposed on a front pillar on the same side of the vehicle body as the first high-frequency pickup and extending longitudinally, each of the first and second high-frequency pickups being adapted to receive surface high-frequency currents induced on the marginal edge of the rear roof of the front pillar by radio or other waves concentrically flowing thereon, one of the first and second pickups being selected over the other to optimize reception of signals.

A second embodiment of the present invention is characterized by a first high-frequency pickup disposed on the trunk lid of the vehicle body at its central position on the side of the passenger room and positioned parallel to the marginal edge of the trunk lid and a second high-frequency pickup located on the front pillar of the vehicle body and positioned parallel to the length thereof, each of the first and second high-frequency pickups being adapted to receive surface high-frequency currents induced on the trunk lid marginal edge or front pillar of the vehicle body flowing concentrically thereon, one of the first and second high-frequency pickups being selected to optimize reception of signals.

A third embodiment of the present invention is characterized by a pair of high-frequency pickups positioned on the roof panel of the vehicle body at spaced locations adjacent to the marginal edge thereof and located parallel to the marginal edge of the roof panel, these high-frequency pickups being adapted to efficiently detect surface high-frequency currents induced on the vehicle body by radio or other waves flowing concentrically on the marginal edge portion of the roof panel, one of the high-frequency pickups being automatically selected to receive signals with a sensitivity better than that of the other high-frequency pickup.

A fourth embodiment is characterized by a space diversity reception antenna system comprising a pair of high-frequency pickups for efficiently detecting surface high-frequency currents induced on the connections of the vehicle body by radio or other waves flowing thereon, one of the high-frequency pickups being automatically selected to receive signals more sensitively.

A fifth embodiment is characterized by a pair of high-frequency pickups located on the trunk lid and/or engine hood of the vehicle body at their marginal edges on the side of the passenger room and spaced from each other and parallel to the marginal edges, these high-frequency pickups being adapted to efficiently detect surface high-frequency currents induced on the trunk lid and/or engine hood of the vehicle body by radio or other waves flowing concentrically thereon, one of the high-frequency pickups being automatically selected to receive signals more sensitively.

Finally, a sixth embodiment is characterized by a pair of high-frequency pickups located on the marginal edge of the vehicle body at different spaced locations and parallel thereto and for efficiently detecting surface high-frequency currents induced on the vehicle body by radio or other waves flowing concentrically on the marginal edge of the vehicle body, one of the high-frequency pickups being automatically selected to receive signals more sensitively.

BRIEF DESCRIPTION OF THE DRAWINGS

FIGS. 13, 14 and 15 illustrate an electromagnetic coupling type loop antenna used as the first high-frequency pickup which is fixedly mounted on the rear roof of the vehicle body.

FIGS. 16, 17 and 18 illustrate an electromagnetic coupling type high-frequency pickup used as the second high-frequency pickup which is mounted on the front pillar of the vehicle body.

FIG. 35 is a diagram showing one modification of the automobile antenna system according to the present invention.

FIG. 43 is a circuit diagram of the automobile antenna system.

FIG. 47 is a circuit diagram of the automobile antenna system.

FIGS. 74 and 74A illustrates the orientation of the surface currents.

DETAILED DESCRIPTION OF PREFERRED EMBODIMENTS

Preferred embodiments of an automobile antenna system according to the present invention will now be described with reference to the drawings.

LOCATIONS AT WHICH HIGH-FREQUENCY PICKUPS ARE PLACED

Reference will first of all be made to various high-density receiving areas of the vehicle body in which high-frequency pickups are to be positioned, that is, various locations on the vehicle body wherein the density of surface currents induced by radio or other waves is higher with less noise.

Referring to FIGS. 4 to 9, there is illustrated a process of investigating a distribution of high-frequency currents to determine the most suitable location at which an antenna system according to the present invention is to be placed on the vehicle body.

Figure 4:
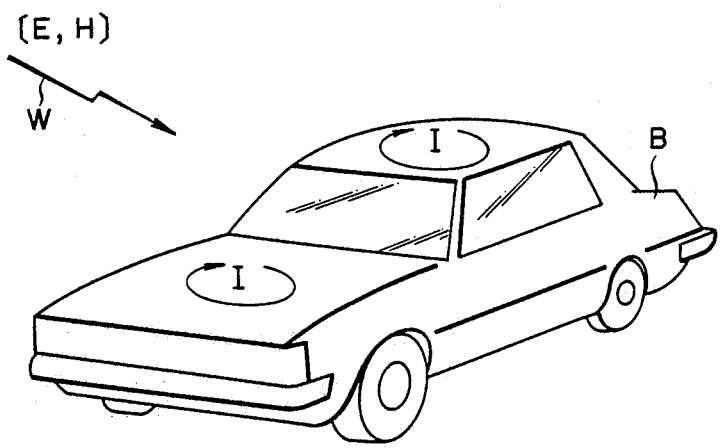
FIG. 4 illustrates surface currents I induced on the vehicle body B by external wave W.

FIG. 4 illustrates that when external waves such as radio or other waves W have passed through the vehicle body of conductive metal material B, surface currents having an intensity corresponding to that of the external waves are induced on the vehicle body at various locations. The present invention is intended to utilize those external waves belonging to relatively high frequency bands equal to and higher than 50 MHz, such as FM waves, TV waves and others.

Within such a range of frequency bands, the present invention is intended to measure a distribution of induced currents on the vehicle body and to determine a location on the vehicle body at which a pickup means is to be located and in which the density of the surface currents is higher with less noise.

To determine the distribution of surface currents, a simulation may be carried out by the use of a computer and at the same time the intensity of the surface currents are actually measured at the respective locations. In accordance with the present invention, a probe is utilized which is constructed and functions in accordance with the same principle as that of the high-frequency pickup means mounted on the vehicle body at desired locations as will be described. the probe is moved over the entire surface of the vehicle body and also angularly rotated at the respective location on the vehicle body to measure the surface currents.

Figure 5:
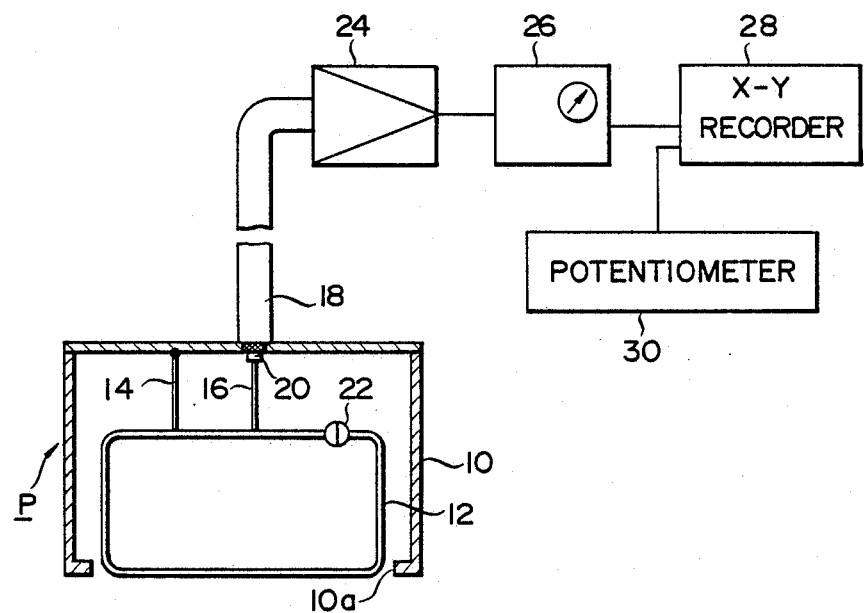
FIG. 5 illustrates a probe and its processing circuit used to determine a distribution of surface currents on the surface of the vehicle body, the probe being constructed and functioning in accordance with the principle of the high-frequency pickups according to the present invention.

FIG. 5 shows such a probe P which comprises a casing 10 of electrically conductive material and a loop coil 12 disposed within the casing 10 and protected from any external and undesirable waves by the casing 10. The casing 10 is provided with an opening 10a through which a portion of the loop coil 12 is externally exposed. The exposed portion of the loop coil 12 is positioned in close proximity to the surface of the vehicle body B to detect a magnetic flux formed by the surface currents thereon. The loop coil 12 is electrically connected with the casing 10 through a short-circuiting line 14. The output terminal 16 of the loop coil 12 is electrically connected with a core conductor 20 in a coaxial cable 18. The loop coil 12 includes a capacitor 22 for causing the frequency of the loop coil 12 to resonate with a desired frequency to be measured to increase the efficiency of the pickup.

As seen from FIG. 5, th e output of the probe P is amplified by a high-frequency voltage amplifier 24 with the amplified signals being measured at a high-frequency voltage measuring device 26 and at the same time recorded by an X-Y recorder 28 as data representing a distribution of surface currents on the vehicle body. The X-Y recorder also receives signals indicative of the respective locations on the vehicle body from a potentiometer 30. In such a manner, one can know the intensity of the surface high-frequency currents at the respective locations on the vehicle body.

Figure 6:
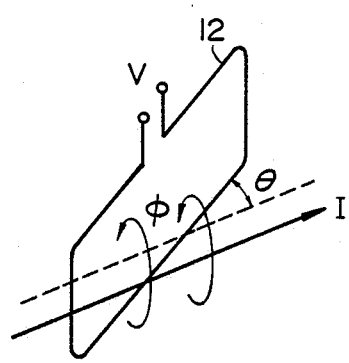
FIG. 6 illustrates an electromagnetic coupling between the surface currents I and a pickup-up loop antenna.
Figure 7:
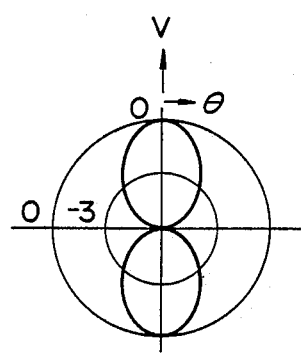
FIG. 7 illustrates a directional pattern in the loop antenna shown in FIG. 6.

FIG. 6 illustrates an angle of deviation $\theta$ between the surface high-frequency currents I and the loop coil 12 of the pickup means. As shown, a magnetic flux $\phi$ formed by the currents I intersects the loop coil to create a detection voltage V in the loop coil 12. As shown in FIG. 7, the voltage V becomes maximum when the angle of deviation $\theta$ is equal to zero, that is, when the loop coil 12 of the pickup means becomes parallel to the orientation of the surface currents I. When the probe P is rotated to obtain the maximum voltage at each of the measurement points, one can know the orientation of the surface currents I at that point.

Figure 8:
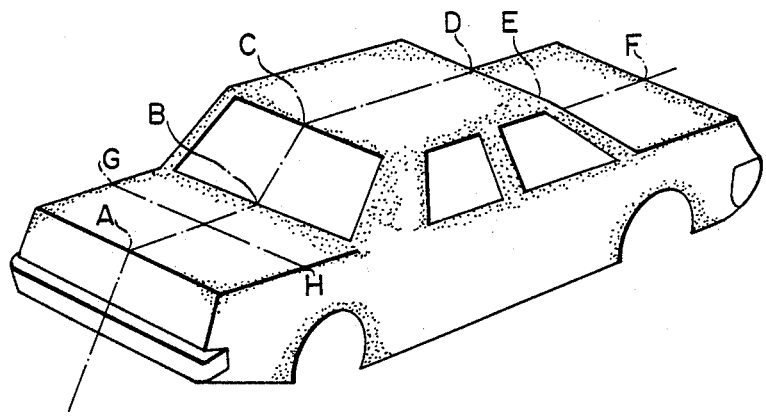
FIG. 8 illustrates a distribution of intensity of the surface currents.
Figure 9:
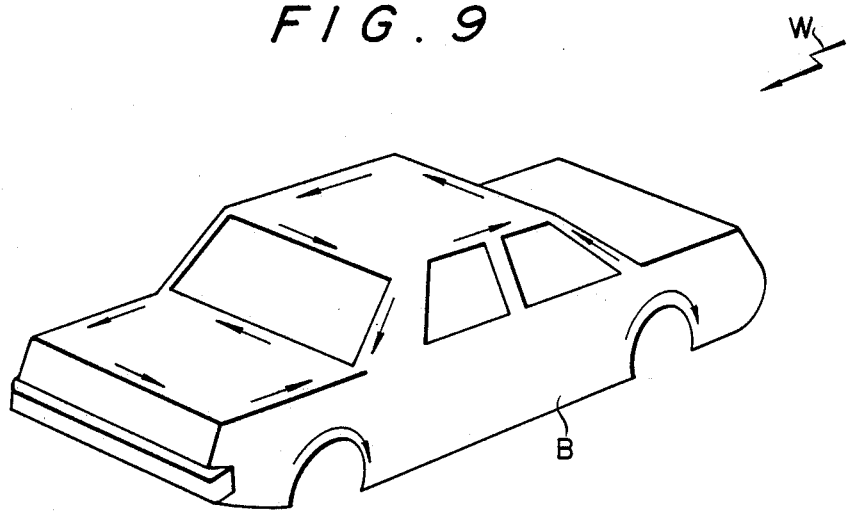
FIG. 9 illustrates the directions of the surface currents.

FIGS. 8 and 9 illustrate the magnitude and orientation of surface high-frequency currents on the vehicle body at each of the locations, which are induced by external waves having a frequency equal to 80 MHz, these values being determined from the measurements of said probe P and by a simulation using a computer. As seen from FIG. 8, the density of the surface currents is higher at locations along the marginal edges of the flat vehicle portions and very low at the central area of each of the flat panel portions on the vehicle body.

As seen from FIG. 9, further, the surface currents flow concentrically in the direction parallel to the marginal edge of each of the vehicle portions or along each of the connections between the flat vehicle portions.

Figure 11:
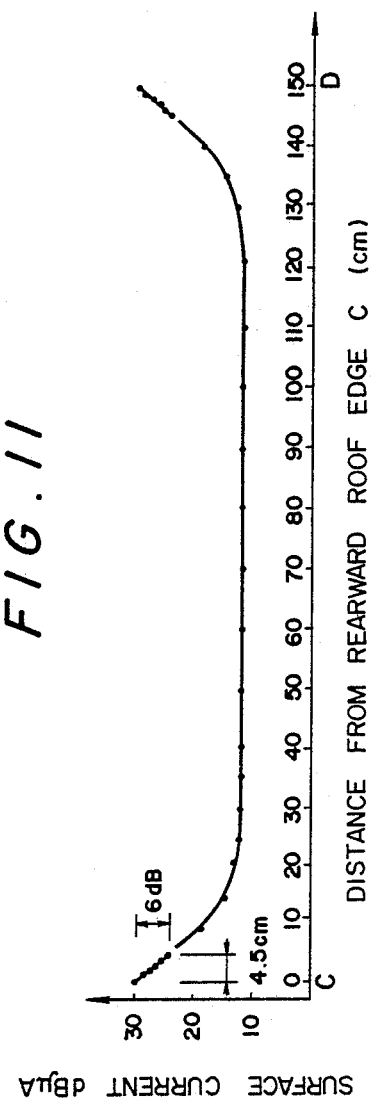
FIGS. 10, 11 and 12 are graphs respectively showing distributions of surface currents on the vehicle body along a longitudinal axis A through F in FIG. 8.
Figure 12:
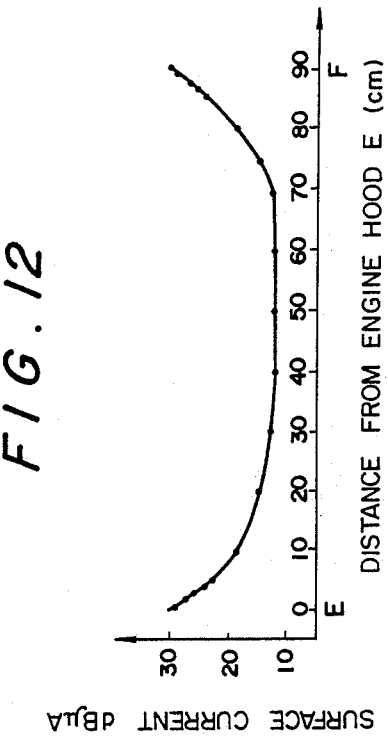
Figure 10:
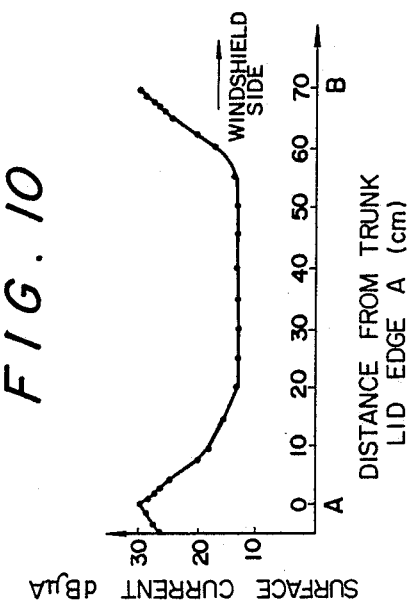

FIGS. 10 to 12 show distributions of surface currents induced on the vehicle body at various locations along a longitudinal axis shown in FIG. 8.

FIG. 10 shows a distribution of surface currents on the trunk lid along a section A-B of the longitudinal axis. As seen from this figure, the magnitude of the surface currents is maximum at the opposite ends of this section A-B and decreases from the opposite ends of the lid toward the center thereof.

FIG. 11 shows a distribution of surface currents along the roof of the vehicle body while FIG. 12 illustrates a distribution of surface currents along the engine hood of the vehicle body. Studying such distributions of surface currents with the magnitude and orientation of the surface currents shown in FIGS. 8 and 9, it is understood that the surface high-frequency currents flow concentrically on the vehicle body in directions parallel to the marginal edges of the roof and engine hood with the level thereof decreasing toward the central portions thereof.

Moreover, the surface high-frequency currents similarly flow concentrically along the connections between the respective flat portions on the vehicle body, such as pillars supporting the roof panel, trunk hinges and others. For example, with FM frequency bands, the surface currents flow on the pillar portions with densities equal to or higher than those of the other vehicle portions. This tendency will increase as the frequency increase. As a result, the antenna system can detect surface currents on the pillars which could not provide any practical antenna outputs for AM frequency bands.

In accordance with the present invention, therefore, it is possible that when high-frequency pickup means is disposed near the marginal edge of each of the vehicle body portions or along each of the connections between the flat vehicle body portions, surface high-frequency currents flowing thereon are efficiently detected to receive radio or other waves more sensitively.

Preferred embodiments of a diversity type automobile antenna system according to the present invention will be described below.

FIRST EMBODIMENT

The first embodiment of the present invention provides a space diversity type automobile antenna system comprising a first high-frequency pickup disposed on the right or left side of the rear roof on the vehicle body at its rearward edge and extending along the length of the rearward edge of the rear roof and a second high-frequency pickup positioned on a front pillar of the vehicle body at the same side of the vehicle body as the first high-frequency pickup and extending along the length of the pillar, one of the first and second high-frequency pickups being selected to receive signals at a time.

When the first and second high-frequency pickups are arranged on the right side of the vehicle body, the sensitivity of the first high-frequency pickup is higher in the rightward and longitudinal directions of the vehicle body while the second high-frequency pickup has its higher sensitivity in the rightward and leftward directions of the vehicle body.

When the first and second high-frequency pickups are positioned on the left side of the vehicle body, the sensitivity of the first pickup is higher in the leftward and longitudinal directions of the vehicle body while the sensitivity of the second pickup is higher in the rightward and leftward directions of the vehicle body.

Thus, the two high-frequency pickups have FM band directional patterns so formed that one of the pickups will complement the sensitivity of the other pickup which is lower than that of said one pickup. And yet these pickups are spatially spaced longitudinally from each other. Therefore, a good space diversity can effectively be attained by changing the pickups from one to the other on reception.

Although it has been described that the high-frequency pickup means, for example, a loop antenna is disposed in close proximity to the marginal edge of any vehicle portion, it is preferred that the pickup means is spaced from that marginal edge within a range depending on the carrier frequency of radio or other waves to be received to provide very good sensitivity.

FIGS. 10 to 12 illustrate distributions of surface currents induced on the vehicle body by FM radio waves having a frequency equal to 80 MHz. As seen from these figures, the value of the surface currents decrease from the edge or end toward the central portion of the vehicle body. Considering the level of the surface currents decreased below 60 dB which is a lower limit for actually obtaining good sensitivities, it is understood that if the pickup means is located at a location spaced from the edge portion within a distance of 4.5 cm, very good sensitivities can be obtained.

For the carrier frequency equal to 80 MHz, the antenna system according to the present invention is sufficiently practicable if its high-frequency pickup means is spaced from the marginal edge of any vehicle portion within a range of 4.5 cm.

From the simulation of the computer and experiments, it has been found that such a practical spacing between the marginal edge of the vehicle portion and the pickup means depends on the carrier frequency of radio or other waves to be received and also decreases as the level of the carrier frequency increases.

From the above fact that the practical spacing is inversely proportional to the level of the carrier frequency, a good performance of reception can be obtained for each of the carrier frequencies if the high-frequency pickup means according to the present invention is disposed spaced from the marginal edge of any flat metal portion on the vehicle body within a range represented as follows:

$$12 \times 10^{-3} \, c/f \, (m)$$

where c is the velocity of light and f is the carrier frequency.

Since the spacing between the pickup means and the marginal edge of the vehicle portion depends on the level of the frequency, the pickup means may be disposed on the vehicle portion at a location spaced from the marginal edge thereof within a range of 3.6 cm for the carrier frequency equal to 100 MHz. As the level of the carrier frequency increases, the high-frequency pickup means should be located nearer the marginal edge of the vehicle portion.

When the high-frequency pickup means is mounted on a connection between flat vehicle panels, for example, a pillar or trunk hinge, said spacing may not be considered. The high-frequency pickup means may merely be disposed in close proximity to that connection and parallel to the length thereof to detect radio or other waves more sensitively.

When high-frequency pickups are located on the vehicle body near the marginal edges of different locations thereon to receive radio or other waves, the directional patterns of these pickups are different from each other.

The present invention is characterized by the high-frequency pickups having their directional patterns different from each other and being combined to form a diversity receiving system which can always receive radio or other waves more sensitively. To this end, the antenna system according to the present invention comprises a first high-frequency pickup disposed on the right or left side of the rear roof of the vehicle body at the rearward edge thereof and extending parallel to the length of the marginal edge and a second high-frequency pickup located on a front pillar of the vehicle body in the same side as the first high-frequency pickup and extending parallel to the length of the pillar, the first and second high-frequency pickups defining a diversity type automobile antenna system.

The first embodiment of the present invention will now be described in more detail.

Figure 1:
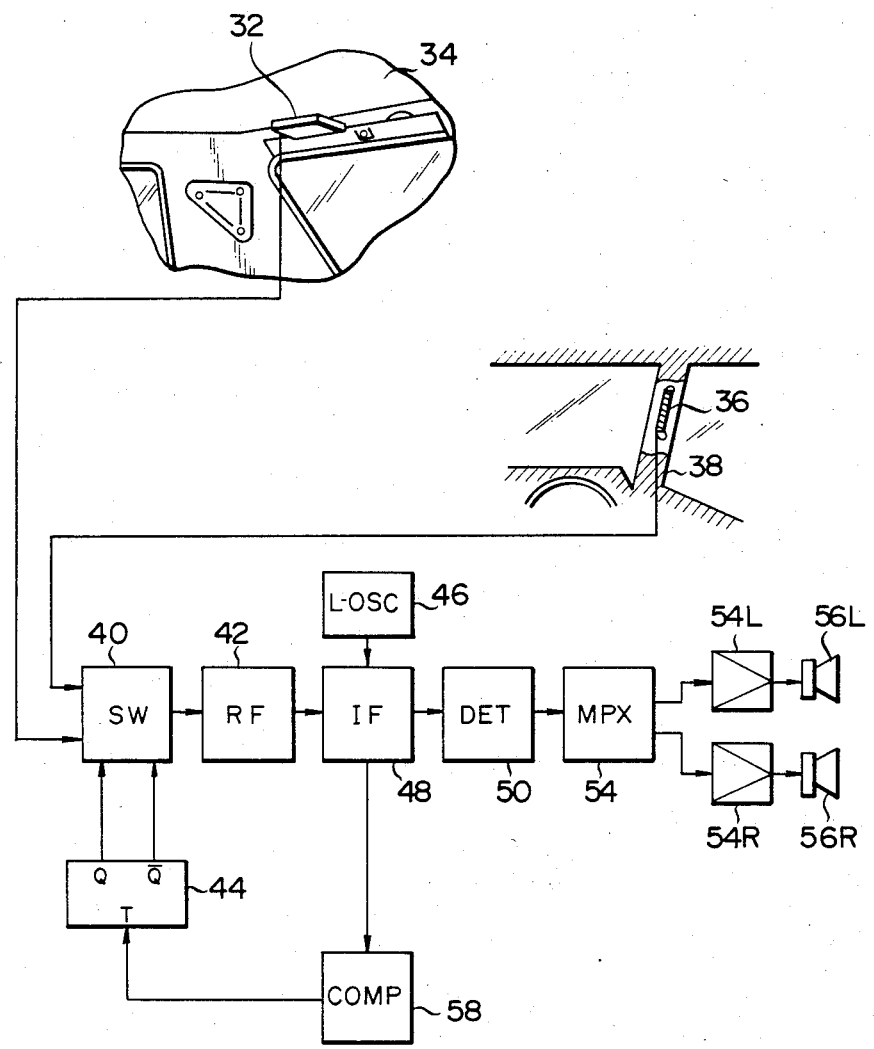
FIG. 1 is a schematic diagram of the entire construction of an automobile antenna system which is a first embodiment of the present invention.

Referring to FIG. 1, there is shown a first high-frequency pickup 32 mounted on the rightward and rearward edge of a rear roof 34 and extending parallel to the length of the rear roof 34 and a second high-frequency pickup 36 mounted on a rightward and forward pillar 38 and extending parallel to the length thereof.

Figure 2:
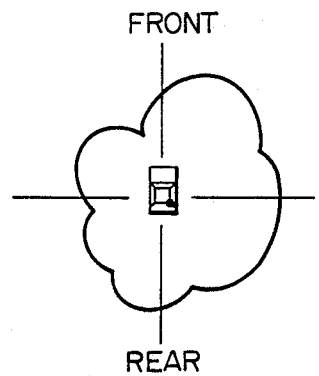
FIGS. 2 and 3 illustrate directional patterns in the high-frequency pickups used in the system shown in FIG. 1 for FM bands.

FIG. 2 shows FM band directional pattern in the first high-frequency pickup 32. As seen from this figure, the first high-frequency pickup 32 has its sensitivity increased in the rightward and longitudinal directions with respect to the vehicle body.

Figure 3:
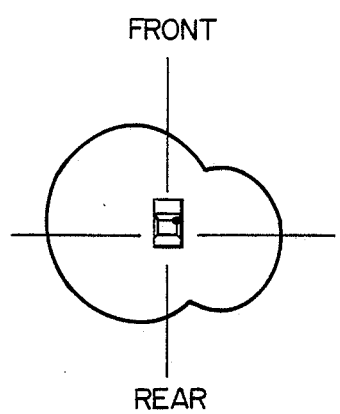

As seen from FIG. 3, the second high-frequency pickup 36 has its sensitivity increased in the rightward and leftward directions with respect to the vehicle body.

When the first and second high-frequency pickups 32 and 36 are combined with each other, therefore, one of the pickups can complement the other to receive FM radio waves more sensitively.

The first and second high-frequency pickups 32 and 36 are spaced from each other a distance of about 1.5 meters to about 1.8 meters in the longitudinal direction of the vehicle body. Since the wavelength of FM radio waves is in the order of 3.0 meters, the antenna system including such a combination of the high-frequency pickups 32 and 36 can make the space diversity very effective.

In the first embodiment of FIG. 1, both the first and second high-frequency pickups 32 and 36 are located on the rightward side of the vehicle body. However, the present invention permits these pickups 32 and 36 to be disposed on the left side of the vehicle body. In such a case, the directional patterns of the first and second high-frequency pickups 32 and 36 are completely inverse in the leftward and rightward directions in comparison with those shown in FIGS. 2 and 3. However, the complement between the first and second pickups provides the same advantages as in the first embodiment.

Referring again to FIG. 1, each of the first and second high-frequency pickups 32 and 36 has its output connected with a high-frequency amplifying circuit 42 through a switching circuit 40 via a coaxial cable.

The switching circuit 40 is actuated on receiving a signal from the output of a T-shaped flip flop 44. When the switching circuit 40 is actuated, one of the outputs of the first and second high-frequency pickups 32 and 36 is selectively coupled with the input of the high-frequency amplifying circuit 42. The output of the high-frequency amplifying circuit 42 is connected with an intermediate frequency amplifying circuit 48 which is in turn connected with a local oscillator circuit 46 and also a detector circuit 50 from which only voice signals are fetched.

The fetched voice signals are divided into right-hand and left-hand outputs through a multiplexer 52, which outputs are then supplied respectively to right-hand and left-hand amplifiers 54R and 54L. The amplified right- and left hand voices are then reproduced by right- and left-hand speakers 56R and 56L.

The output signals from the intermediate frequency amplifying circuit 48 are compared with its threshold at a comparator 58 which is adapted to generate a trigger output used for inverting the T-shaped flip flop 44 if the sensitivity of either one of the high-frequency pickups 32 and 36 is reduced below a predetermined level.

The inversion of output in the flip flop 44 causes the switching circuit 40 to change from one of the high-frequency pickups 32 and 36 to the other which has a better sensitivity.

In such a manner, there is provided a space diversity reception type antenna system in which the first high-frequency pickup 32 on the rear roof 34 and the second high-frequency pickup 36 on the front pillar are complemented by each other with respect to their directional patterns to render the antenna system more sensitive at all times.

Figure 13:
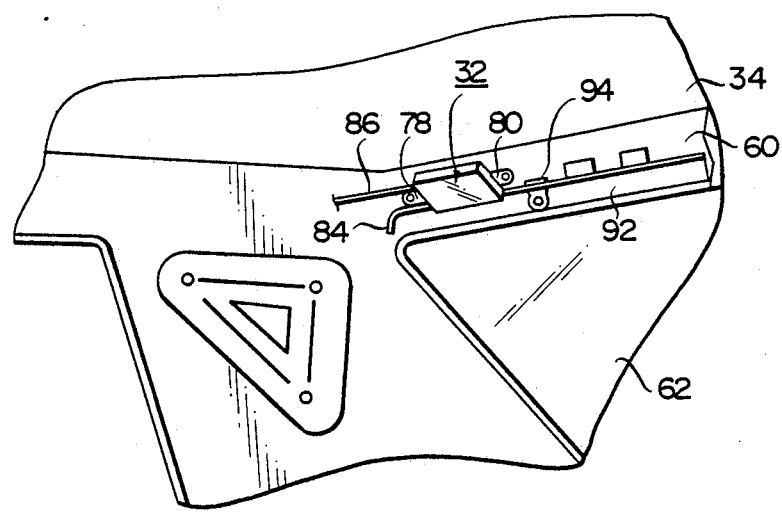

Referring to FIG. 13, there is shown the rear roof 34 as uncovered, which includes a rear window frame 60 formed thereon at the marginal edge. The rear window frame 60 is in turn connected with a rear window glass 62.

As shown in FIG. 14, the high-frequency pickup 32 includes a metallic casing 64 for shielding external magnetic fluxes and a loop antenna 66 mounted in the casing 64, all of which forms an electromagnetic coupling type pickup having a structure similar to that of the aforementioned probe including the loop coil used to determine the distribution of surface currents on the vehicle body.

Figure 15:
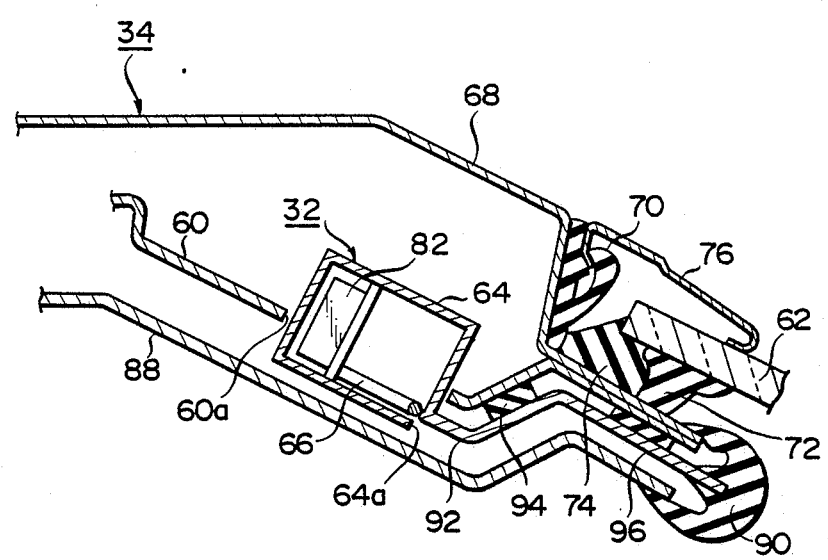

FIG. 15 shows the mounting of the high-frequency pickup 32 on the rear roof 34. The rear roof 34 includes a rear roof panel 68 on which the rear window frame 60 is fixedly mounted at one edge. The rear roof panel 68 also fixedly supports the rear glass 62 through fastener means 70 and dam means 72 which are air-tightly connected with each other through adhesive 74. A molding 76 is mounted between the roof panel 68 and the rear window glass 62.

Further, a roof garnish 88 is fixedly mounted on the roof panel 68 inside of the rear window frame 60. The marginal edges of the roof garnish 88 and rear window frame 60 are covered by an edge molding 90.

The edge molding 90 is supported by an edge molding retainer 92 located between the rear window frame 60 and the roof garnish 88. The retainer 92 is separated from the rear window frame 60 by spacers 94 and 96.

The rear window frame 60 is provided with an opening 60a within which the casing 64 of the high-frequency pickup 32 is positioned to arrange a loop antenna 66 in the high-frequency pickup 32 in close proximity to the marginal edge of the retainer 92.

The first embodiment is characterized in that the loop antenna 66 of the high-frequency pickup 32 is disposed in close proximity to the marginal edge of the retainer 92 along the length thereof.

If the length of the retainer 92 is substantially equal to the half-wavelength of FM radio waves, the sensitivity of the high-frequency pickup 32 can further be improved.

As seen best from FIG. 15, the casing 64 of the high-frequency pickup 32 includes an opening 64a formed therein, through which one of the longer sides of the loop antenna 66 is externally exposed. The exposed portion of the loop antenna 66 is disposed in close proximity to the marginal edge of the retainer 92.

Thus, the loop antenna 66 as located within the casing 64 can positively catch a magnetic flux formed by surface high-frequency currents flowing on the marginal edge of the retainer 92. Conversely, any external magnetic fluxes other than the magnetic flux caught by the loop antenna 66 can positively be shielded by the casing 64. Therefore, the surface currents induced on the vehicle body by radio or other waves can more sensitively be detected by the high-frequency pickup 32.

As shown in FIG. 14, L-shaped brackets 78 and 80 are respectively connected with the opposite ends of the casing 64 by any suitable fastening means such as bolts. These brackets 78 and 80 are then fastened to the rear window frame 60 as by screws so that the casing 64 of the high-frequency pickup 32 can positively be fastened to the edge molding retainer 92.

The casing 64 of the high-frequency pickup 32 contains a circuitry 82 electrically connected with the loop antenna 66. The circuitry 82 includes various circuits for processing signals, such as a pre-amplifier and others. The processed signal are fetched externally through a coaxial cable 84 and then processed by circuits similar to those used to determine the distribution of surface currents on the vehicle body. The circuitry 82 receives power and control signals through a cable 86.

The loop antenna 66 is in the form of a single-winding antenna the winding of which is covered with an insulating coating such that the loop antenna 66 can be electrically insulated from and positioned in close proximity to the retainer 92. This permits the loop antenna 66 to intersect a magnetic flux formed by the surface currents on the vehicle body.

In the first embodiment, the exposed portion of the loop antenna 66 outside of the casing 64 is spaced from the marginal edge of the retainer 92 within a distance of 4.5 cm. Therefore, the high-frequency pickup 32 can positively detect radio waves having particularly a frequency of 50 to 300 MHz from the surface currents flowing on the marginal edge of the retainer 92. Since the orientation of the surface currents is along the marginal edge of the retainer as shown in FIG. 9, the exposed portion of the loop antenna 66 is preferably disposed parallel to the marginal edge of the retainer 92.

Figure 16:
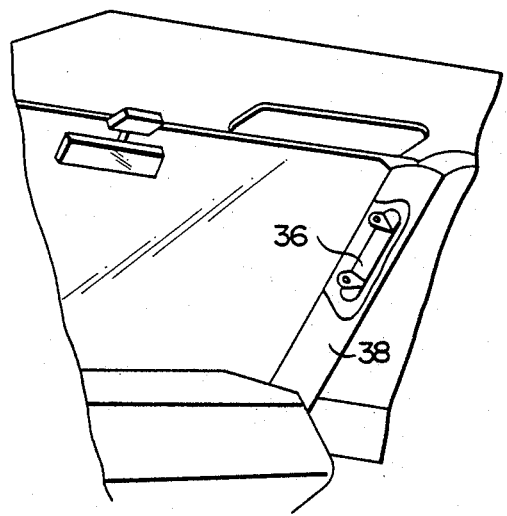
Figure 17:
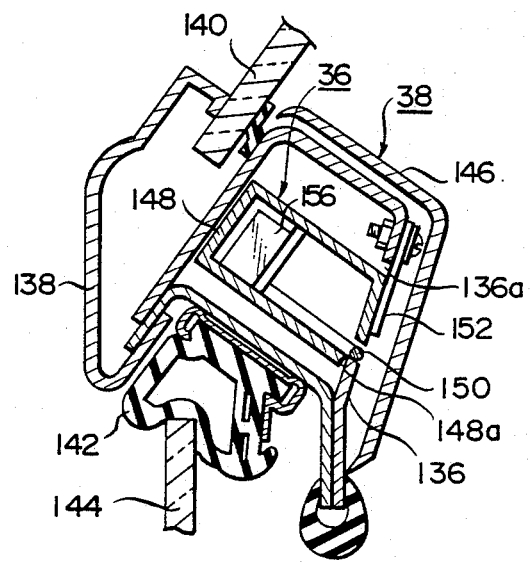

Referring now to FIGS. 16 to 18, the second high-frequency pickup 36 is mounted within one of front pillars 38 for supporting the roof panel of the vehicle body. The second high-frequency pickup 36 is similarly in the form of an electromagnetic coupling type pickup including a loop antenna.

As seen from FIG. 17, the front pillar 38 includes a pillar leg plate 136 which provides a main hollow column of quadrilateral configuration. The outer side of the pillar leg plate 136 supports a windshield molding 138 which in turn supports a windshield glass 140.

The rearward side of the pillar leg plate 136 supports a weather strip 142 of rubber for water-tightly sealing between the pillar leg plate 136 and a side glass 144.

The inner side of the pillar leg plate 136 is covered by a front pillar garnish 146 rendering the pillar leg plate 136 an aesthetic appearance.

The present invention is characterized in that the high-frequency pickup is disposed parallel to the length of a pillar and thus the front pillar 38 in the first embodiment. In the illustrated embodiment, the electromagnetic coupling type high-frequency pickup 36 is mounted within the interior of the pillar leg plate 136.

As seen from FIGS. 17 and 18, the high-frequency pickup 36 comprises a casing 148 of electrically conductive material and a loop antenna 150 mounted within the casing 148 such that the loop antenna 150 can be shielded from external magnetic field. The casing 148 is provided with an opening 148a through which a portion of the loop antenna 150 is externally exposed. The exposed portion of the loop antenna 150 is thus disposed in close proximity to the pillar leg plate 136 on which the surface high-frequency currents flow concentrically.

The pillar leg plate 136 is provided with an opening 136a through which the high-frequency pickup 36 is inserted into the interior of the pillar leg plate 136 before a front pillar garnish 146 is mounted on the pillar leg plate 136.

To insure that the casing 148 of the high-frequency pickup 36 is fixedly mounted on the pillar leg plate 136, the casing 148 includes brackets 152 and 154 fastened to the opposite end thereof as by spot-welding. These brackets 152 and 154 are in turn fastened to the pillar leg plate 136 as by screws, as shown.

In such an arrangement, the loop antenna 150 is disposed in close proximity to the edge of the opening 136a in the pillar leg plate 136. As a result, a magnetic flux formed by the surface high-frequency currents flowing concentrically on the pillar leg plate 136 can more efficiently intersect the loop antenna 150.

The casing 148 also contains a circuitry 156 including pre-amplifier means and others which is located behind the loop antenna 150 within the casing 148. The circuitry 156 is supplied with power and control signals through a cable 158. Signals fetched by the loop antenna 150 are fetched externally through a coaxial cable 160 and then processed by circuits similar to those used to determine the distribution of surface currents on the vehicle body as described hereinbefore.

The loop antenna 150 is similarly in the form of a single-winding coil which is covered with an electrical insulation coating such that the coil can electrically be insulated from and disposed in closed proximity to the pillar leg plate 136.

After the high-frequency pickup 36 has been mounted in the front pillar 38, the latter is covered by the front pillar garnish 146 to provide an ordinary appearance which is not different from the conventional pillar construction.

Although the first embodiment of the present invention has been described as to the electromagnetic coupling type high-frequency pickups, it may similarly utilize an electrostatic coupling type pickup.

An electrostatic coupling type pickup may comprise detecting electrodes located on the rear roof and front pillar of the vehicle body through air gaps or insulations and extending parallel to the length of the marginal edge of the respective vehicle portion. Surface high-frequency currents are fetched by the detecting electrode through an electrostatic capacity formed between the surface of each of the rear roof and front pillar and the detecting electrode. Thus, high-frequency signals can be fetched for a desired frequency band.

The first embodiment provides a diversity reception type automobile antenna system which can efficiently receive radio or other waves, with less noise, from the surface high-frequency currents flowing on the marginal edges of the rear roof and front pillar and yet which is small-sized without any externally exposed portion such as pole antenna and others.

SECOND EMBODIMENT

The second embodiment of the present invention provides a space diversity type antenna system comprising a pair of high-frequency pickups each of which is located on the trunk lid or one of the front pillars on the vehicle body wherein the density of surface currents induced on the vehicle body by radio or other waves is higher with less noise.

In the second embodiment, the first high-frequency pickup is disposed on the central portion of the trunk lid of the vehicle body near the inner edge thereof and extending parallel to the length of the inner edge. The second high-frequency pickup is located on one of the front pillars on the vehicle body and extends parallel to the length of the front pillar. One of the first and second high-frequency pickups is automatically selected to receive radio or other waves more sensitivity.

As previously described and as seen from FIGS. 8 to 12, surface currents induced by radio or other waves flow concentrically on the inner edge of the trunk lid and the front pillar. Therefore, the space diversity type automobile antenna system including the first and second high-frequency pickups arranged as just mentioned is similarly effective to receive radio or other waves more sensitively.

Figure 19:
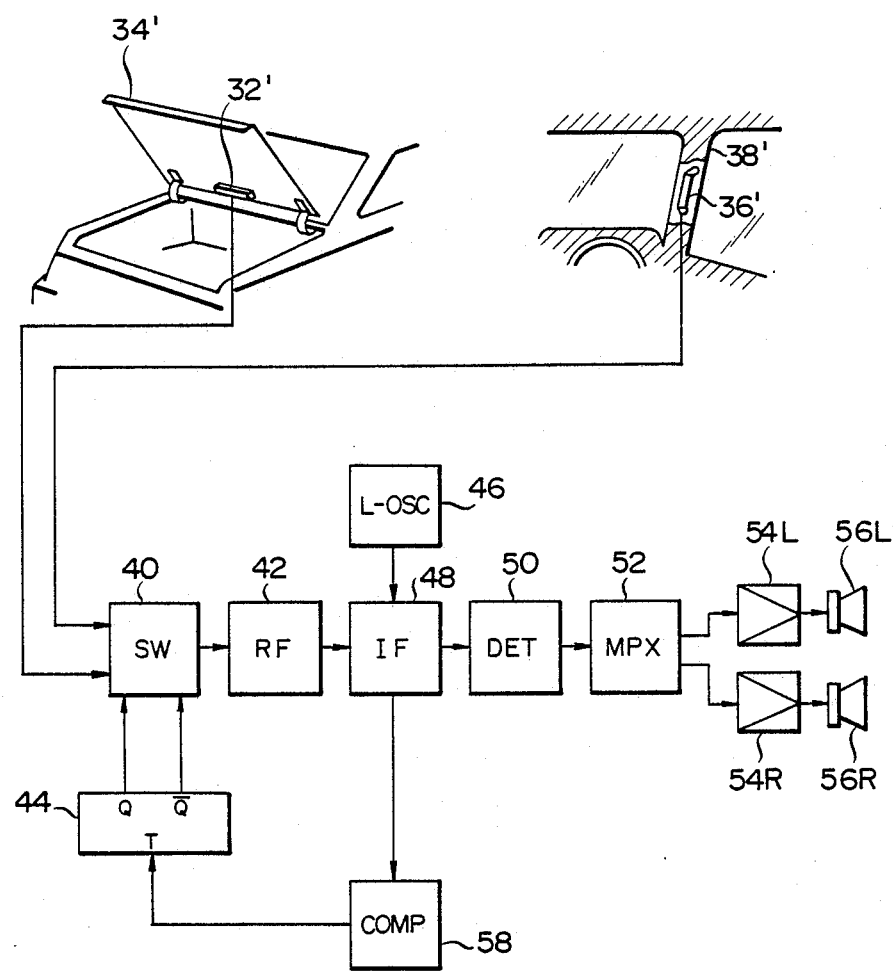
FIG. 19 is a schematic diagram of the entire structure of an automobile antenna system which is a second embodiment of the present invention.

Referring to FIG. 19, there are shown the first high-frequency pickup 32' located on the inner edge of the trunk lid 34' of the vehicle body at the center thereof and extending parallel to the length of the inner edge and the second high-frequency pickup 36' mounted on the forward and rightward pillar 38' of the vehicle body.

Figure 20:
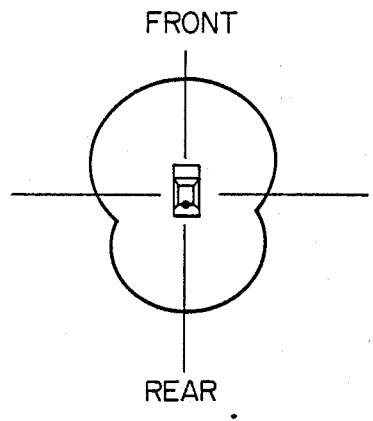
FIGS. 20 and 21 illustrate FM directional patterns of the high-frequency pickups used in the antenna system shown in FIG. 19.

FIG. 20 shows the FM band directional pattern of the first high-frequency pickup 32' mounted on the trunk lid 34'. As seen from this figure, the first high-frequency pickup 32' has its sensitivity increased in the longitudinal direction with respect to the vehicle body.

Figure 21:
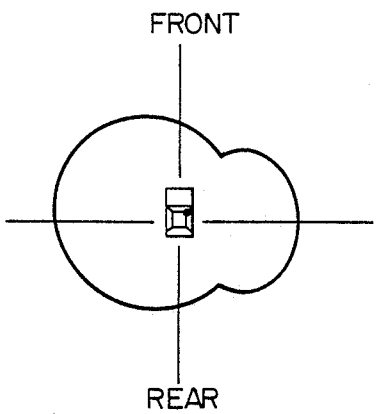

FIG. 21 shows the FM band directional pattern of the second high-frequency pickup 36' mounted on the forward and rightward pillar 38' of the vehicle body. As seen from this figure, the second high-frequency pickup 36' has its sensitivity increased in the rightward and leftward directions with respect to the vehicle body.

When the first and second high-frequency pickups 32' and 36' are combined with each other to form a diversity reception type antenna system, therefore, FM radio waves can more efficiently be received by the fact that the directional pattern of one of the two high-frequency pickups will be complemented by that of the other pickup.

The first and second high-frequency pickups 32' and 36' are spaced from each other a distance equal to about 2 meters in the longitudinal direction of the vehicle body. Since the wavelength of FM waves is equal to about 4 meters, the space diversity is very advantageous for FM wave bands with S/N ratio being improved.

Although the second embodiment of FIG. 19 has been described as to the second high-frequency pickup 36' mounted on the forward and rightward pillar 38' of the vehicle body, the present invention may similarly be applied to such a case that the second high-frequency pickup 36' is to be mounted on the forward and leftward pillar of the vehicle body, with the same advantages as in the first embodiment.

A circuit shown in FIG. 19, which is effective to automatically change one of the first and second high-frequency pickups 32' and 36' such that radio or other waves can be received more sensitively by the selected pickup, is similar to that of the first embodiment shown in FIG. 1 and therefore not further described herein.

Figure 23:
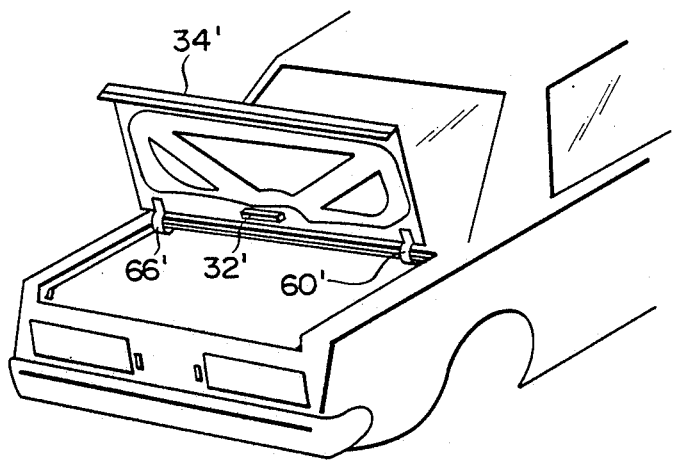

Referring now to FIG. 23, the first high-frequency pickup 32' mounted on the marginal edge of the trunk lid 34' is in the form of an electromagnetic coupling type pickup similar to the aforementioned probe which includes the loop coil used to determine the distribution of surface currents on the vehicle body. The trunk lid 34' is pivotally connected at one edge with the vehicle body through trunk hinges 60'.

Figure 22:
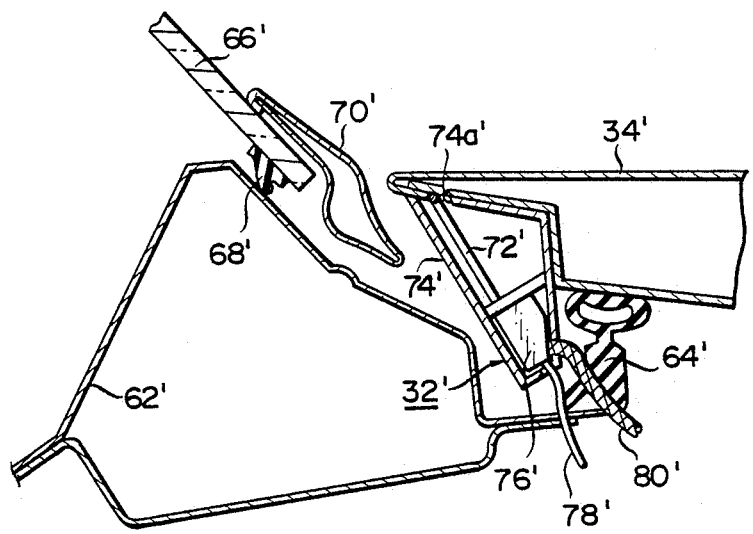
FIGS. 22 through 25 illustrate an electromagnetic coupling type loop antenna used as the first high-frequency pickup which is mounted on the trunk lid of the vehicle body.

Referring next to FIG. 22, there is shown a weather strip 64' for water-tightly sealing between the trunk lid 34' and a rear tray panel 62' so that any external water can be prevented from penetrating into the interior of the vehicle body through a rear window glass 66'.

A dam 68' air-tightly seals between the rear window glass 66' and the rear tray panel 62' to prevent rain, external noise and others from penetrating into the interior of the vehicle body. Further, a molding 70' is provided to cover the lower edge of the rear window glass 66', as well-known in the art.

The second embodiment is characterized in that the first high-frequency pickup 32' is faced to the rear tray panel 62' on the central portion of the marginal edge of the trunk lid 34' such that the length of a loop antenna 72' in the high-frequency pickup 32' will extend parallel to the marginal edge of the trunk lid 34'. Thus, the loop antenna 72' can detect the surface currents on the trunk lid with less noise.

When the loop antenna 72' is to receive FM radio waves having a frequency equal to 80 MHz, it is preferably spaced from the marginal edge of the trunk lid 34' within a range defined by the aforementioned formula: $12 \times 10^{-3}$ c/f (m), that is, within a distance of 4.5 cm. Thus, the loop antenna 72' can positively and efficiently catch the surface currents flowing concentrically on the marginal edge portion of the trunk lid 34'.

Since the orientation of the surface currents flowing on the vehicle body is along the marginal edges thereof as seen from FIG. 9, the loop antenna 72' is arranged such that the length thereof is parallel to the marginal edge of the trunk lid 34'.

The first high-frequency pickup 32' comprises a casing 48' of electrically conductive material within which the loop antenna 72' and associated circuit section 76' including a pre-amplifier and others are housed. The casing 74' is provided with an opening 74a faced to the trunk lid 34'.

In such a manner, the loop antenna 72' housed within the casing 74' can catch only a magnetic flux formed by the surface high-frequency currents flowing on the marginal edge of the trunk lid 74' while at the same time any undesirable and external flux can positively be shielded by the casing 74'.

The loop antenna 72' is in the form of a single-winding coil located along the turned edge of the trunk lid 34', which coil is covered with an insulating layer such that it can electrically be insulated from and located in close proximity to the trunk lid 34'. Thus, a magnetic flux formed by the surface currents can efficiently intersect the loop antenna 72'.

The circuit 76' is supplied with power and control signals through a cable 78'. Signals received by the loop antenna 72' are externally fetched through a coaxial cable 80' and then processed by circuits similar to those used to determine the distribution of surface currents on the vehicle body.

Figure 24:
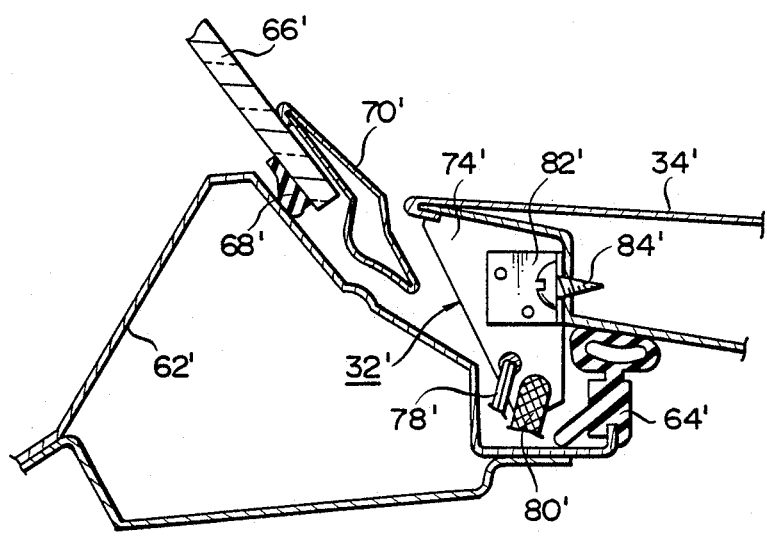
Figure 25:
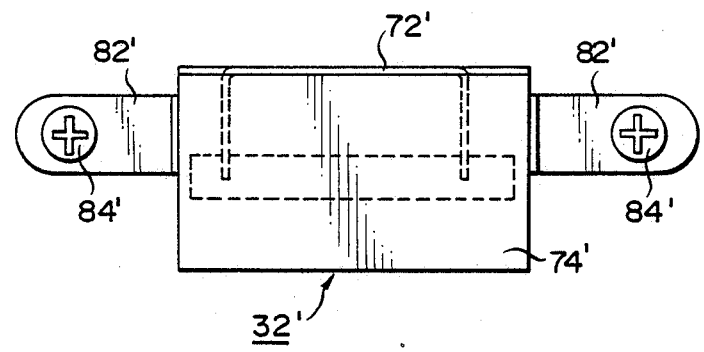

The mounting of the high-frequency pickup 32' on the trunk lid 32' is illustrated in FIG. 24 in which parts similar to those of FIG. 22 are designated by similar reference numerals and will not further be described herein.

In FIG. 24, fittings 82' are fastened to the opposite ends of the casing 74' of the high-frequency pickup 32' as by bolts. Each of the fittings 82' is in turn fastened to the trunk lid 34' by screws 84'. As a result, the high-frequency pickup 32' can firmly be mounted on the inside of the trunk lid 34'.

Figure 26:
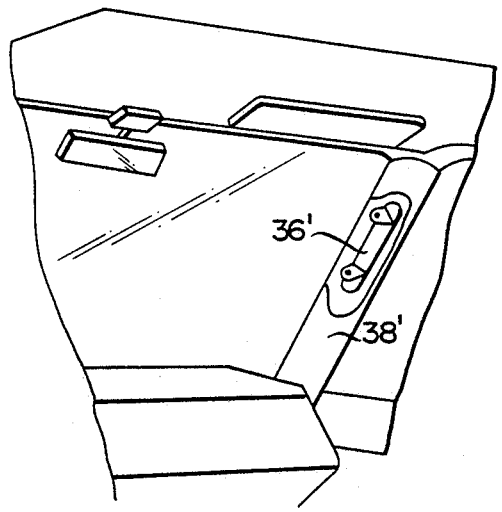
FIGS. 26 to 28 illustrate an electromagnetic coupling type high-frequency pickup used as the second high-frequency pickup which is mounted on the front pillar of the vehicle body.
Figure 27:
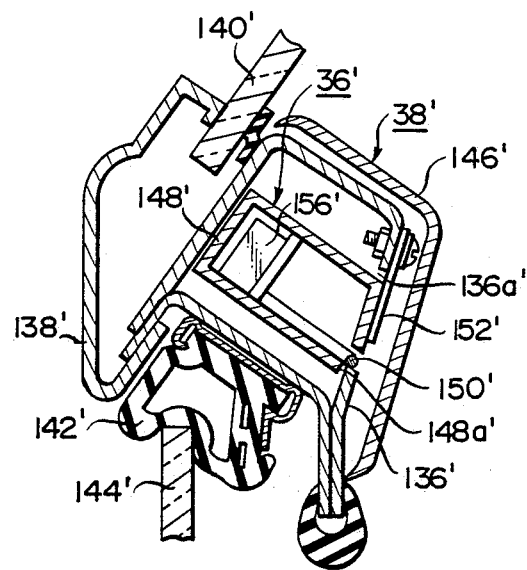
Figure 28:
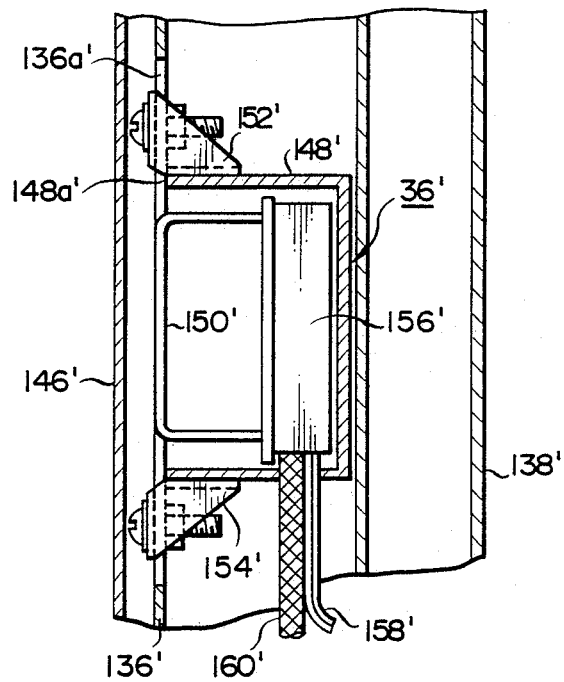

Referring now to FIGS. 26 to 28, there is shown the second high-frequency pickup 36' housed within a front pillar 38' supporting the roof panel of the vehicle body and which also is in the form of an electromagnetic coupling type pickup including a loop antenna.

As seen from FIG. 27, the front pillar 38' includes a pillar leg plate 136' which is in the form of a hollow column of quadrilateral configuration. The outer side of the pillar leg plate 136' supports a windshield molding 138' which in turn supports a windshield glass 140'.

The rearward side of the pillar leg plate 136' supports a weather strip 142' of rubber which water-tightly seals between the pillar leg plate 136' and a side glass 144'.

The inner side of the pillar leg plate 136' supports a front pillar garnish 146' which covers the pillar leg plate 136' to provide an aesthetic appearance.

The present invention is characterized in that the high-frequency pickup 36' is arranged parallel to the length of the pillar, that is, the front pillar 38' in the second embodiment. In the second embodiment, the high-frequency pickup 36' is inserted into the interior of the pillar leg plate 136'.

As seen from FIGS. 27 and 28, the high-frequency pickup 36' comprises a casing 148' of electrically conductive material and a loop antenna 150' housed within the casing 148' such that the loop antenna 150' can be shielded from any undesirable and external flux. The casing 148' is provided with an opening 148a' through which a portion of the loop antenna 150' is externally exposed. The exposed portion of the loop antenna 150' is thus located in close proximity to the pillar leg plate 136' on which the surface high-frequency currents flow concentrically.

In the second embodiment, the pillar leg plate 136' is provided with an opening 136a' through which the high-frequency pickup 36' can be inserted into the interior of the pillar leg plate 136' before a front pillar garnish 146' is mounted on the pillar leg plate 136'.

Brackets 152' and 154' are fastened to the casing 148' of the high-frequency pickup 36' at the opposite ends thereof as by spot-welding. the brackets 152' and 154'are firmly fastened to the pillar leg plate 136' by means of screws, as shown. As s result, the casing 148' of the high-frequency pickup 36' may rigidly be fastened to the pillar leg plate 136'.

In such a manner, the loop antenna 150' is disposed in close proximity to the edge of the opening 136a of the pillar leg plate 136' so that a magnetic flux formed by the surface high-frequency currents flowing concentrically on the pillar leg plate 136' will effectively intersect the loop antenna 150'.

The casing 148' also contains a circuitry 156'which is arranged behind the loop antenna 150'. The circuitry 156' is supplied with power and control signals through a cable 158'. Signals received by the loop antenna 150' are then fetched externally through a coaxial cable 160' and thereafter processed by circuits similar to those used in determining the distribution of surface currents on the vehicle body.

The loop antenna 150' is in the form of a single-winding coil which is covered with an electrical insulation layer such that the coil can be electrically insulated from an located in close proximity to the pillar leg plate 136'. As a result, a magnetic flux formed by the surface high-frequency currents flowing concentrically on the pillar can efficiently intersect the loop antenna 150'.

After the high-frequency pickup 36' has been mounted in the front pillar 38', the front pillar garnish 146' is mounted on the pillar 38' to provide an appearance which is not different from the conventional pillar constructions.

Also in the second embodiment, the electromagnetic coupling type pickup may be replaced by an electrostatic coupling type pickup. In this case, detecting electrodes are positioned on the marginal edges of the trunk lid and front pillar through air gaps or insulating plates. Each of the detecting electrodes extends parallel to the length of the trunk lid or front pillar. Surface high-frequency currents are fetched by the detecting electrodes through electrostatic capacities formed between the marginal edges of the trunk lid and front pillar and the detecting electrodes.

Thus, the second embodiment provides a diversity reception type automobile antenna system which can efficiently receive radio or other waves, with less noise, from the surface high-frequency currents flowing on the trunk lid and front pillar and yet which is small-sized without any externally protruding portion such a a pole antenna and others.

THIRD EMBODIMENT

The third embodiment provides a diversity reception type automobile antenna system comprising a pair of high-frequency pickups which are located on the roof panel of the vehicle body near the marginal edge thereof and spaced from each other a predetermined distance. As previously described and as seen from FIGS. 8 to 12, surface high-frequency currents flow concentrically on the marginal edge of the roof panel on the vehicle body. Thus, the high-frequency pickups mounted on the roof panel can efficiently detect the surface high-frequency currents flowing on the marginal edge of the roof panel. One of the high-frequency pickups is automatically changed to the other such that radio or other waves can be received by the antenna system more sensitively. Thus, the directional pattern of the antenna system may be improved with less multi-path noise.

Referring to FIGS. 29 to 32, there is shown one of the high-frequency pickups 238 which is mounted on the marginal edge portion of the roof panel adjacent to the rear window glass 236.

Figure 29:
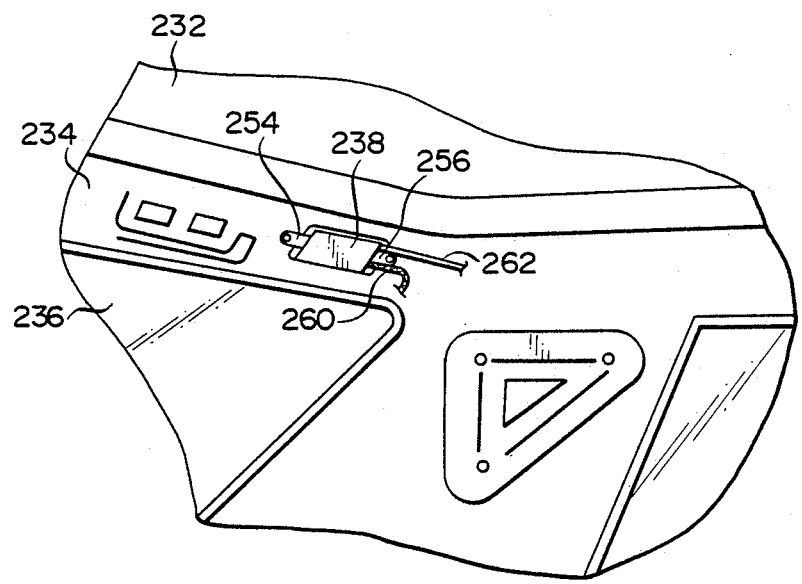
FIG. 29 is a perspective view of a third embodiment of the automobile antenna system according to the present invention, which comprises a diversity antenna defined by one high-frequency pickup mounted on the rear window frame of the roof panel of the vehicle body.

FIG. 29 shows the roof panel 232 of metal material as uncovered, which is connected with the rear window glass 236 through a rear window frame 234. In the third embodiment, the high-frequency pickup 238 is spaced inwardly from the marginal edge of the rear window frame 234 within a range of 4.5 cm.

Figure 30:
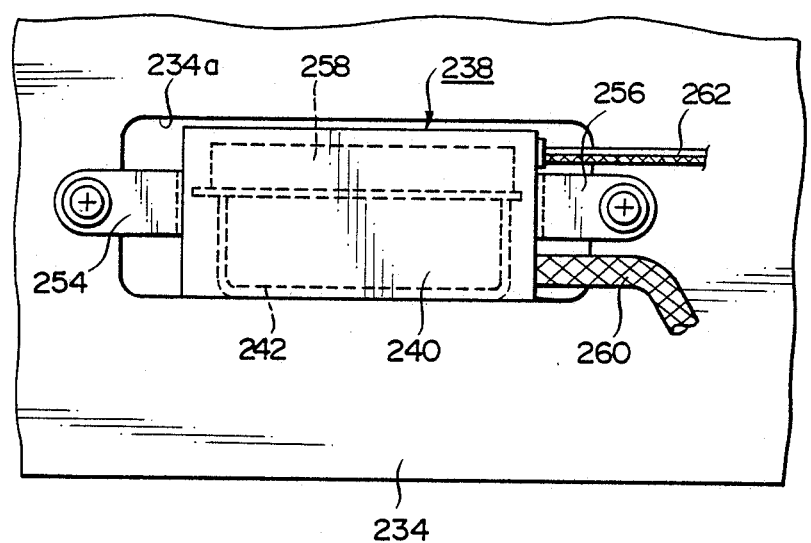
FIG. 30 is a plan view showing the mounting of the high-frequency pickup shown in FIG. 29.

As seen best from FIG. 30, the high-frequency pickup 238 comprises a casing 240 of metal material for shielding any external and undesirable flux and a loop antenna 242 housed within the casing 240. The high-frequency pickup 238 is similarly in the form of an electromagnetic coupling type pickup similar to the aforementioned probe which includes the loop coil used to determine the distribution of surface currents on the vehicle body.

Figure 31:
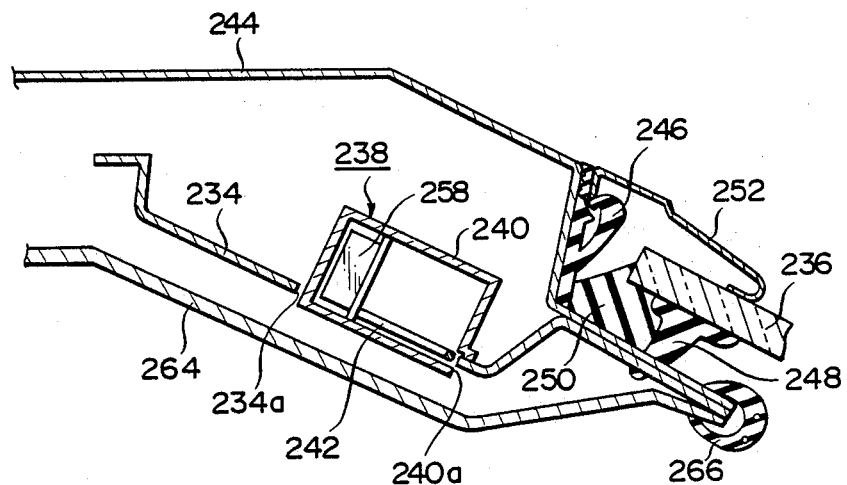
FIG. 31 is a cross-sectional view showing the primary parts of FIG. 29.

FIG. 31 shows the mounting of the high-frequency pickup 238 on the roof panel 232. The roof panel 232 includes a roof panel portion 244 to which the rear window frame 234 is secured at one edge. The roof panel 244 also supports the rear window glass 236 through fastening means 246 and dam means 248 which are air-tightly fastened to each other by adhesive 250. A molding 252 is mounted between the roof panel portion 244 and the rear window glass 236.

The rear window frame 234 is provided with an opening 234a through which the high-frequency pickup 238 is inserted into the rear window frame 234 such that the loop antenna 242 of the high-frequency pickup 238 will be positioned faced to the marginal edge of the rear window frame 234.

As seen best from FIG. 31, the casing 240 is provided with an opening 240a through which one of the longitudinal sides of the loop antenna 242 is externally exposed. The exposed portion of the loop antenna 242 is disposed in close proximity to the edge of the opening 240a in the rear window frame 234. Thus, a magnetic flux formed by the surface high-frequency currents flowing on the marginal edge portion of the rear window frame 234 can positively be detected by the loop antenna 242 within the casing 240. At the same time, any external and undesirable waves can positively be shielded by the casing 240. Therefore, the surface currents induced on the vehicle body by radio or other waves can be detected by the high-frequency pickup 238 more sensitively.

Figure 32:
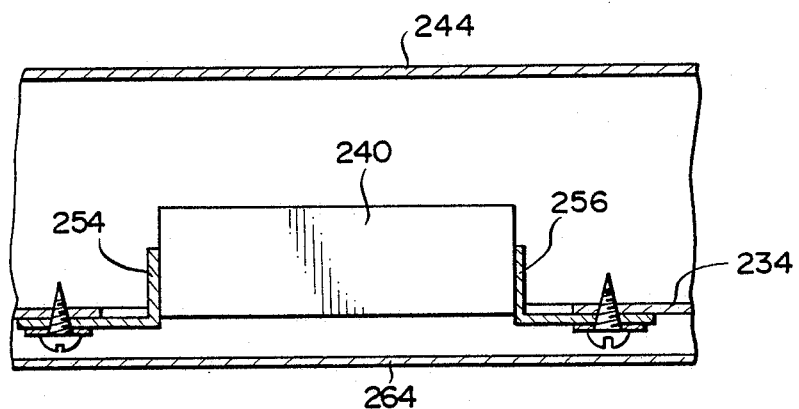
FIG. 32 is a cross-sectional view showing the primary parts of FIG. 29 in the other direction.

As shown in FIG. 32, L-shaped brackets 254 and 256 are fastened to the casing 240 at the opposite end thereof as by bolts. The brackets 254 and 256 also are fastened to the rear window frame 234 by means of screws. As a result, the high-frequency pickup 238 may positively be fastened to the rear window frame 234.

The casing 240 of the high-frequency pickup 232 also includes a circuitry 258 housed in the casing 240 and electrically connected with the loop antenna 242. Detected signals are processed by pre-amplifier means and other in the circuitry 258. The processed signals are externally fetched through a coaxial cable 260 and then processed by circuits similar to those used in determining the distribution of surface currents on the vehicle body. The circuitry 258 is supplied with power and control signals through a cable 262.

The loop antenna 242 is similarly in the form of a single-winding coil which is covered with an electrically insulating coating such that it can be electrically insulated from and positioned in close proximity to the rear window frame 234. As a result, a magnetic flux formed by the surface currents on the vehicle body may effectively intersect the loop antenna 242.

After the high-frequency pickup 238 is mounted on the uncovered roof panel 232 and particularly the rear window frame 234, a roof garnish 264 is fastened to the roof panel. An edge molding 266 is then mounted between the roof garnish 264 and the rear window frame 234.

Also in the third embodiment, the exposed portion of the loop antenna 242 out of the casing 240 is spaced from the marginal edge of the rear window frame 234 within a distance of 4.5 cm. Therefore, the high-frequency pickup 238 can positively receive radio or other waves having a frequency equal to 80 MHz from the surface currents flowing on the marginal edge portion of the rear window frame 234. Since the orientation of the surface currents is along the marginal edge of the vehicle body as shown in FIG. 9, the loop antenna 246 should be arranged such that the length thereof will extend parallel to the marginal edge of the rear window frame 234.

Figure 33:
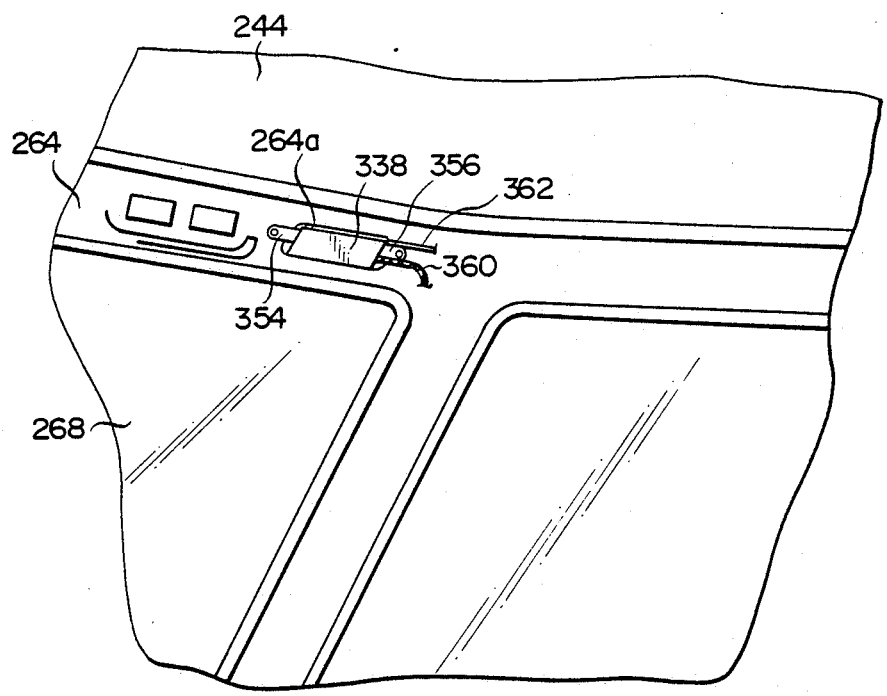
FIG. 33 is a schematical and perspective view of the other high-frequency pickup defining a diversity antenna which is mounted on the header inner panel of the roof panel on the vehicle body.
Figure 34:
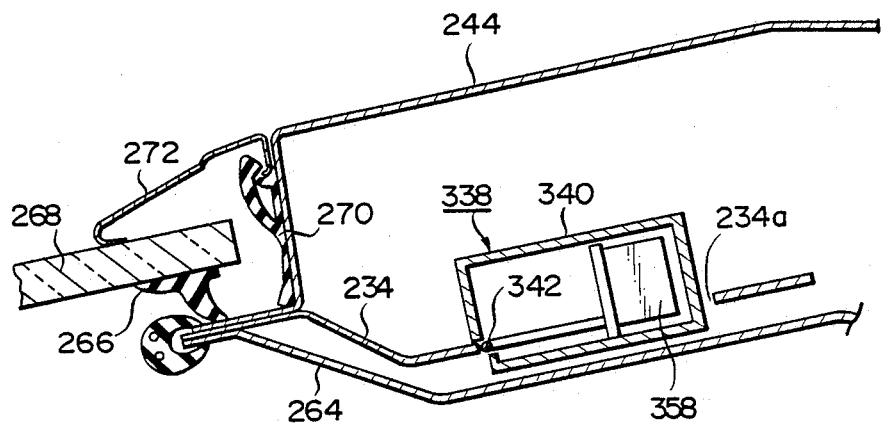
FIG. 34 is a cross-sectional view showing the mounting of the high-frequency pickup shown in FIG. 23.

The other high-frequency pickup 338 is mounted on the roof panel 232 near the forward edge thereof, as shown in FIGS. 33 and 34. The high-frequency pickup 338 is disposed within the service hole 264a in the header inner panel 264 which is provided on the forward edge of the roof panel 232.

As seen from FIG. 34, a windshield glass 268 is connected with a roof panel portion 244 through a dam 266. As well-known in the art, a molding 272 is mounted between the roof panel portion 244 and the windshield glass 268 through a stopper 270.

the high-frequency pickup 338 is similar to the high-frequency pickup 238. Parts similar to those of the high-frequency pickup 238 are denoted by similar reference numerals added by one hundred. As seen from FIG. 34, a loop antenna 342 in the high-frequency pickup 338 is spaced inwardly from the marginal edge of the header inner panel 225 within a distance of 4.5 cm. Therefore, surface current flowing concentrically on the header inner panel 264 can positively be detected by this high-frequency pickup 338.

The two high-frequency pickups 238 and 338 are spaced from each other a distance meeting the spacing between two antennas which should be equal to $\lambda/2$ in a diversity receiving system for AM FM band having its wavelength equal to about 3 meters. In the third embodiment, this spacing is set to be in the order of 1.8 to 1.5 meters.

Referring next to FIG. 35, there is shown a circuit for automatically selecting one of two high-frequency pickups 238 and 338 which may receive signals more sensitively at a particular time. Each of the high-frequency pickups 238 and 338 includes a coaxial cable 260 or 360 which is electrically connected with a switching circuit 274. The switching circuit 274 is actuated by the output of a T-shaped flip flop 276 as will be described. As a result, signals received by the high-frequency pickup 238 or 338 are supplied to the input of a high-frequency amplifier circuit 278 and then transmitted to a detector circuit 284 through an intermediate frequency amplifier circuit 282 which also is connected with a local oscillator circuit 280. At the detector circuit 284, only voice signals are fetched from the detected signals.

Thereafter, voice signals are separated into right-hand output and left-hand output by a multiplexer 286. Each of the left- and right-hand output is transmitted to a speaker 290L or 290R through an amplifier 286L or 286R.

The output signals from the intermediate frequency amplifier 282 are compared with its threshold by a comparator 292. The comparator 282 is set to have a level to be exhibited by the output of the intermediate frequency amplifier circuit 282 if each of the high-frequency pickups 238 and 338 has its sensitivity reduced below a predetermined level. When the output of the intermediate frequency amplifier 282 is reduced below said level on reception of one of the high-frequency pickups 238 and 338, the comparator 292 generates a trigger signal which is in turn supplied to the T-shaped flip flop 296. At this time, the output of the t-shaped flip flop 296 is inverted.

This inversion of output causes the switching circuit to actuate so that one of the high-frequency pickups will be changed to the other which may receive radio or other waves more sensitively.

In such a manner, the sensitivities of the high-frequency pickups 238 and 338 may be complemented by one another to improve their directional patterns and also to reduce multi-path noise.

Figure 37:
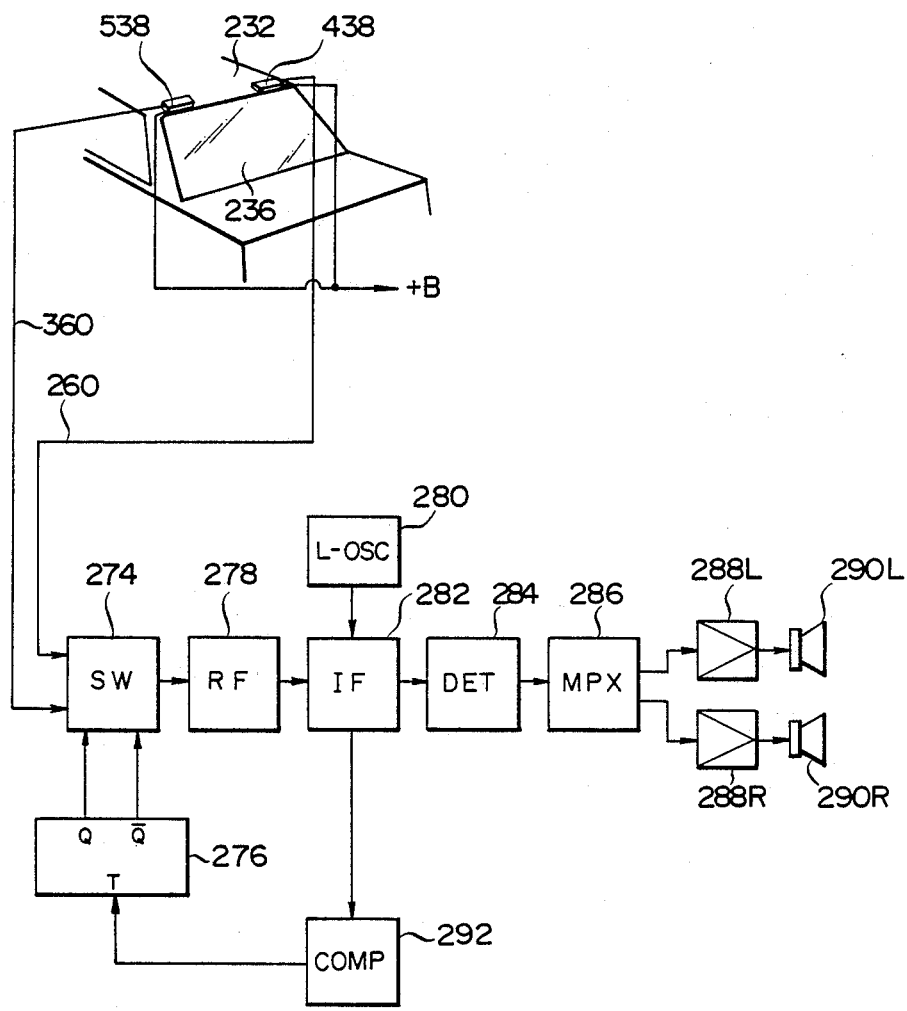
FIG. 37 is a diagram showing another modification of the automobile antenna system according to the present invention.

In accordance with the present invention, a pair of high-frequency pickups 438 and 538 may be mounted on the roof panel 232 near the marginal edge of the rear window glass as shown in FIG. 37. Furthermore, these high-frequency pickups 438 and 538 are spaced from each other within a range meeting such a condition that the spacing between two antennas should be below $\lambda/2$ in the diversity receiving system and AM FM band having a wavelength $\lambda$ equal to about 3 meters is to be received by the antenna system. In the third embodiment, the two high-frequency pickups 438 and 538 are spaced from each other a distance equal to about 1 to 1.2 meters.

The third embodiment provides a diversity reception type automobile antenna system comprising a pair of high-frequency pickups for efficiently detecting surface currents induced on the roof panel of the vehicle body by radio or other waves and flowing concentrically on the marginal edge of the roof panel and which has an improved directional pattern with less multi-path noise.

FOURTH EMBODIMENT

Figure 38:
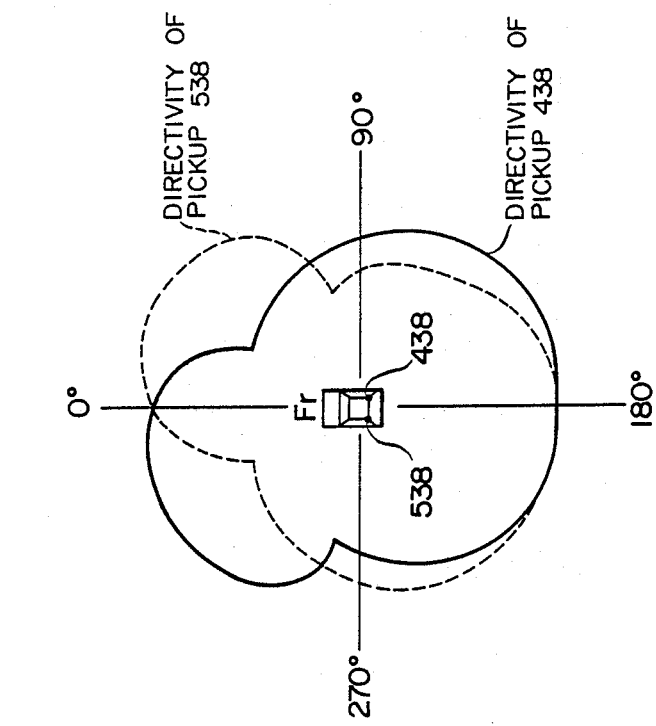
FIG. 38 illustrates directional patterns in the high-frequency pickups shown in FIG. 37.
Figure 36:
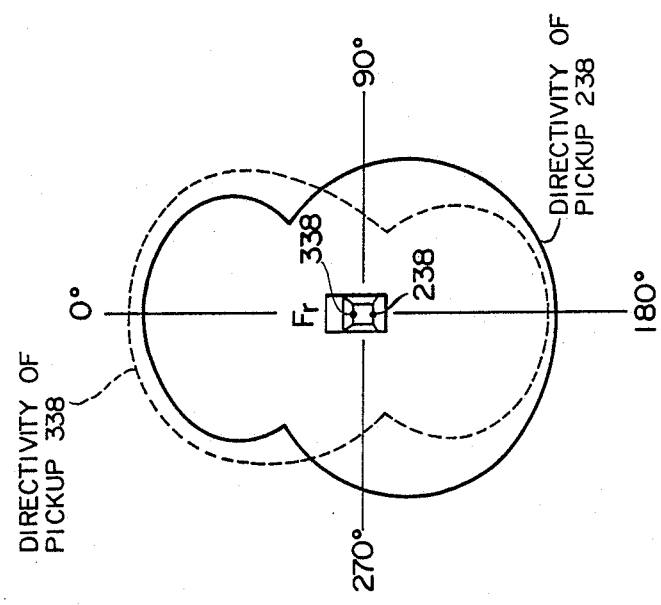
FIG. 36 illustrates directional patterns in the high-frequency pickups in the embodiment of FIG. 35.

Referring to FIG. 38, the fourth embodiment provides a diversity reception type automobile antenna system comprising a pair of high-frequency pickups 1032 and 1132 which are mounted in the front pillars 1034 and 1134 of the vehicle body supporting the roof panel thereof, respectively. Each of these high-frequency pickups 1022 and 1132 is similarly in the form of an electromagnetic coupling type pickup.

Figure 40:
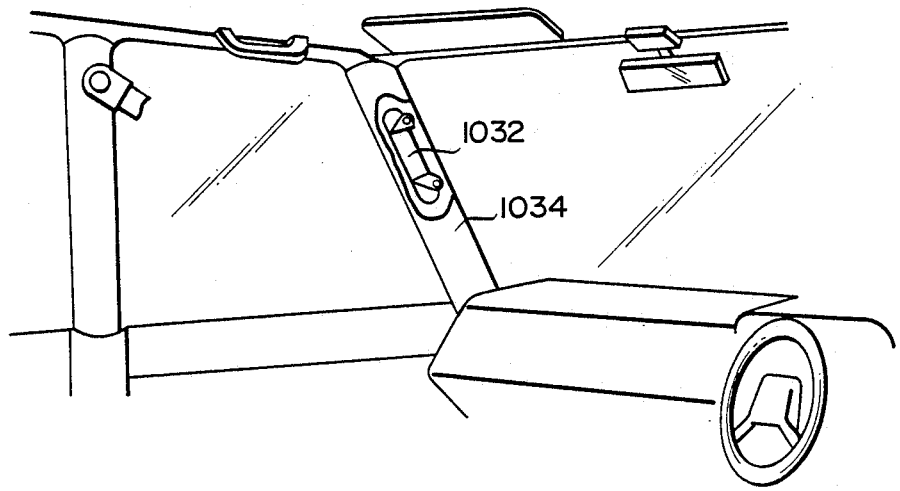
FIG. 40 illustrates one of the high-frequency pickups mounted on the corresponding one of the front pillars.

The high-frequency pickup 1032 mounted in one of the front pillars 1034 will now be described with reference to FIGS. 40 to 42.

Figure 41:
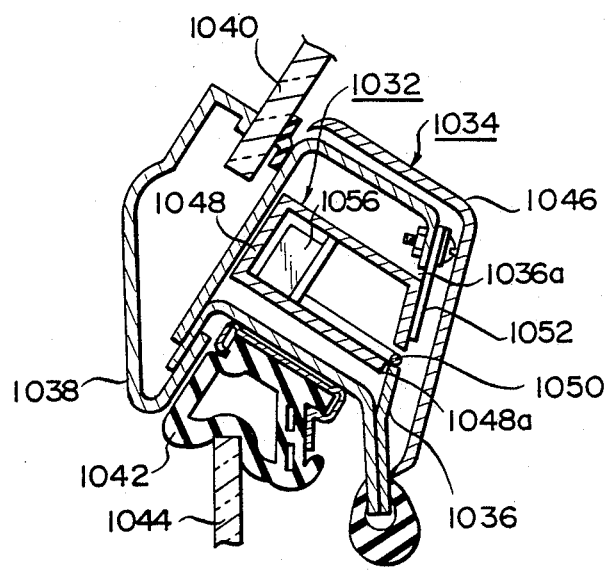
FIG. 41 is a cross-sectional view of an electromagnetic coupling type high-frequency pickup mounted on the front pillar shown in FIG. 40.

As seen best from FIG. 41, the front pillar 1034 includes a pillar leg plate 1036 which is a hollow column of quadrilateral configuration. The outer side of the pillar leg plate 1036 supports a windshield molding 1038 which in turn holds a windshield glass 1040.

The rearward side of the pillar leg plate 1036 supports a weather strip 1042 of rubber which watertightly seals between the pillar leg plate 1036 and a side glass 1044.

The inner side of the pillar leg plate 1036 holds a front pillar garnish 1046 which covers the surface of the pillar leg plate 1036 to provide an aesthetic appearance.

The electromagnetic coupling type high-frequency pickup 1032 is mounted in the interior of the pillar leg plate 1036 and extends parallel to the length thereof.

Figure 42:
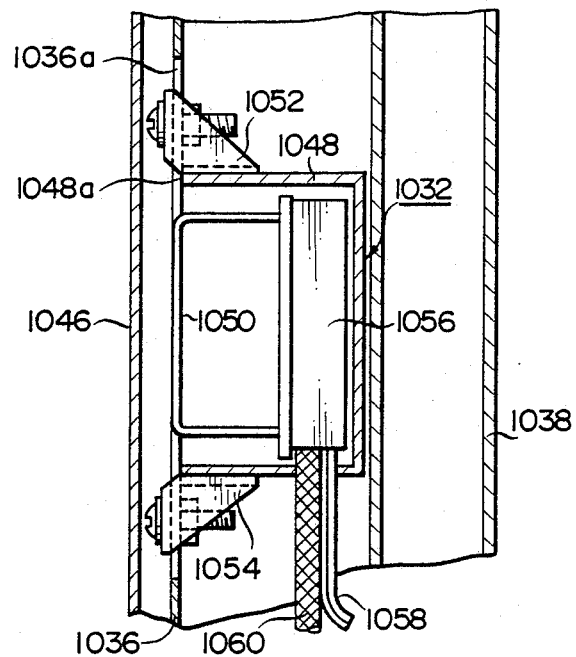
FIG. 42 is a longitudinal section of the primary parts shown in FIG. 41.

As seen from FIGS. 41 and 42, the high-frequency pickup 1032 comprises a casing 1048 of electrically conductive material and a loop antenna 1050 mounted in the casing 1048 so that the loop antenna 1050 can be shielded from any external and undesirable flux. However, the casing 1048 is provided with an opening 1048a through which a portion of the loop antenna 1050 is externally exposed. The exposed portion of the loop antenna 1050 is disposed in close proximity to the pillar leg plate 1036 on which surface high-frequency currents flow concentrically as previously described.

The pillar leg plate 1036 is provided with an opening 1036a through which the high-frequency pickup 1032 can be inserted into the interior of the pillar leg plate 1036 before the front pillar garnish 1046 is mounted on the pillar leg plate 1036.

Brackets 1052 and 1054 are fastened to the opposite ends of the casing 1048 as by spot-welding. These brackets 1052 and 1054 are firmly fastened to the pillar leg plate 1036 by means of screws. Thus, the high-frequency pickup 1032 may rigidly be fastened to the pillar leg plate 1036.

In such a manner, the exposed portion of the loop antenna 1050 is disposed in close proximity to the edge of the opening 1036a in the pillar leg plate 1036 such that a magnetic flux formed by the surface high-frequency currents flowing concentrically on the pillar leg plate 1036 will efficiently intersect the loop antenna 1050.

The casing 1048 also contains a circuitry 1056 including pre-amplifier means and other processing circuits, which is positioned behind the loop antenna 1050. The circuitry 1056 is supplied with power and control signals through a cable 1058. Signals received by the loop antenna 1050 are externally fetched through a coaxial cable 1060 and then suitably processed by circuits similar to those used in determining the distribution of surface currents on the vehicle body.

The loop antenna 1050 is similarly in the form of a single-winding coil which is covered with an electrical insulation coating such that the coil can be electrically insulated from and located in close proximity to the pillar leg plate 1036.

After the high-frequency pickup 1032 has been mounted in the front pillar 1034, the front pillar garnish 1046 is mounted on the front pillar 1034 to provide an appearance which is not different from the conventional pillar structues.

Figure 39:
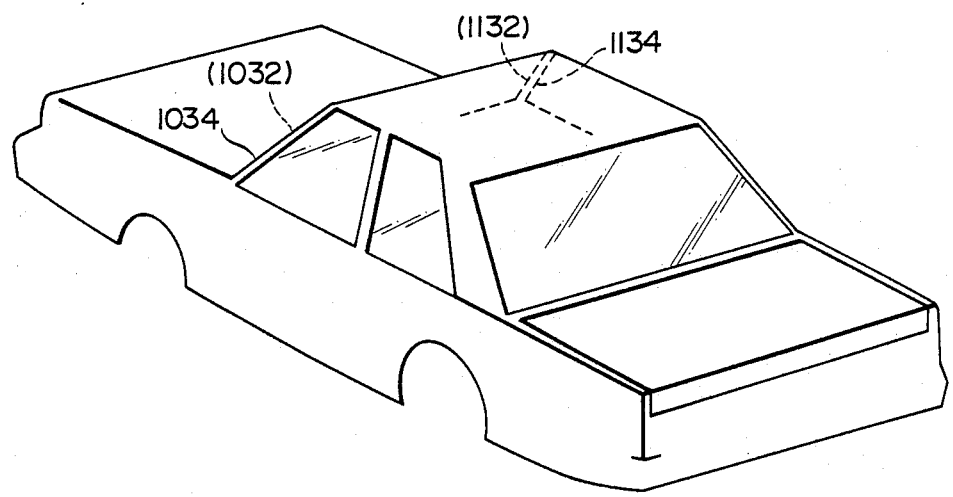
FIG. 39 is a schematic and perspective view of a fourth embodiment of an automobile antenna system according to the present invention, showing the mounting of high-frequency pickups on the front pillars of the vehicle body.

The other high-frequency pickup 1132 has its construction and function similar to those of the high-frequency pickup 1032 except that the pickup 1132 is mounted on the other front pillar 1134 (see FIG. 39) and therefore the description thereof will be omitted.

The front pillars 1034 and 1134 are spaced from each other a distance of about 1.8 meters to about 1.5 meters. For AM FM radio wave having a wavelength equal to about 3 meters, therefore, two high-frequency pickups 1032 and 1132 mounted in the front pillars 1034 and 1134 can provide an excellent antenna system of space diversity receiving type.

FIG. 43 shows a circuit effective to automatically select one of two high-frequency pickups 1032 and 1132 such that radio or other waves can more efficiently be received by the selected pickup.

Each of the high-frequency pickups 1032 and 1132 is electrically connected with a switching circuit 1064 through a coaxial cable 1060 or 1160. The switching circuit 1064 is actuated on receiving the output of a T-shaped flip flop 1066 which will be described hereinafter. When the switching circuit 1064 is actuated, one of the high-frequency pickups 1032 and 1132 is selected with its output being supplied to the input of a high-frequency amplifier circuit 1068. When the output signals are transmitted from the high-frequency amplifier 1068 to a detector circuit 1074 through an intermediate frequency amplifier circuit 1072 which also is connected with a local oscillator circuit 1070, only voice signals are externally fetched and then supplied to left- and right-hand amplifiers 1078L and 1078R through a multiplexer 1076. The amplified voice signals are then supplied to speakers 1080L and 1080R, respectively.

Output signals from the intermediate frequency amplifier 1072 are compared with a reference value at a comparator 1082. If an output signal produced from the intermediate frequency amplifier 1072 when either of the high-frequency pickups 1032 or 1132 has its sensitivity reduced below a predetermined level is smaller than said reference value, the comparator 1082 then generates a trigger signal which is in turn supplied to the T-shaped flip flop 1066, thereby inverting the output of the flip flop 1066.

This inversion of output causes the switching circuit 1064 to actuate so that one of the high-frequency pickups 1032 and 1132 will be selected to receive radio or other waves more sensitively.

Figure 44:
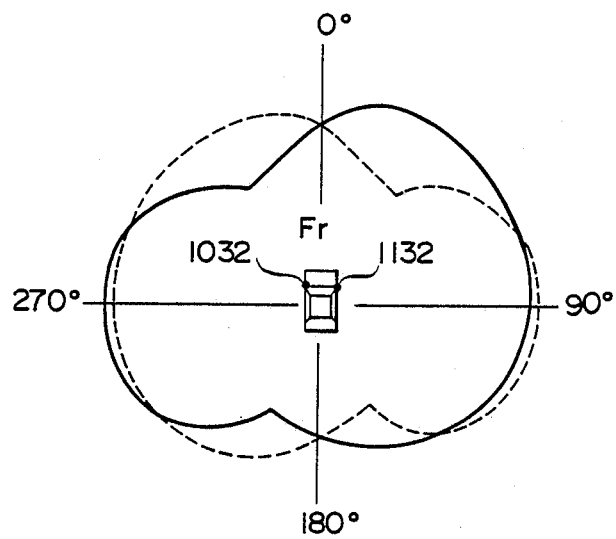
FIG. 44 illustrates directional patterns in the high-frequency pickups mounted on the front pillars of the vehicle body.

As seen best from FIG. 44, therefore, the directional pattern of one of the high-frequency pickups 1032 and 1132 will be complemented by that of the other high-frequency pickup to improve the entire sensitivity of the antenna system with less multi-path noise.

Figure 45:
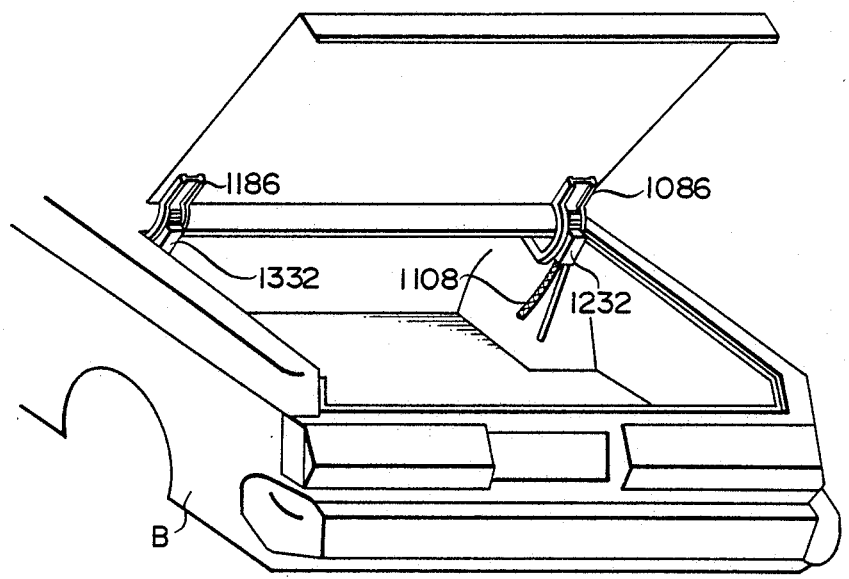
FIG. 45 illustrates a modification of the automobile antenna system which comprises a pair of high-frequency pickups defining a diversity receiving antenna mounted on both the trunk hinges of the vehicle body.
Figure 46:
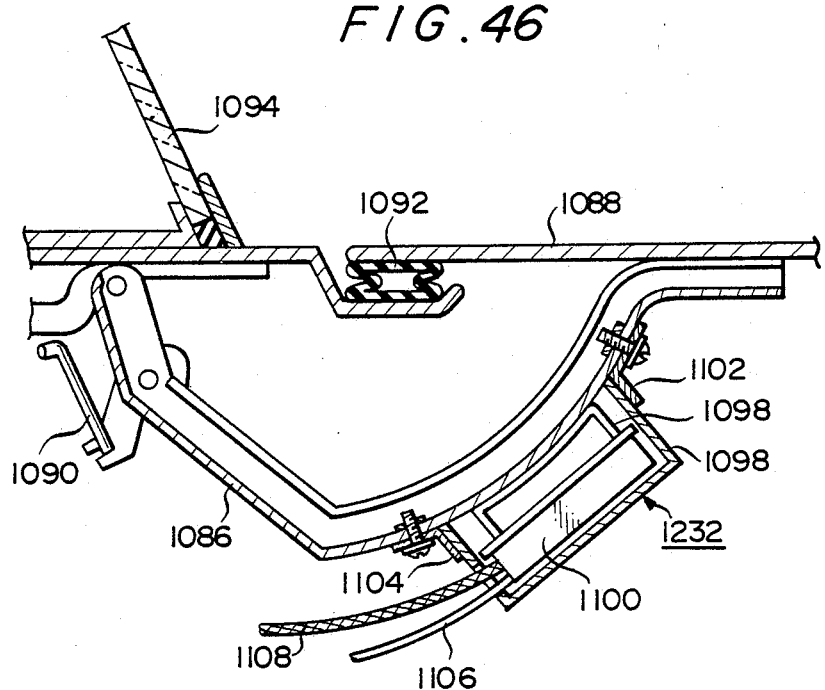
FIG. 46 is a cross-sectional view showing the primary parts of one of the trunk hinges shown in FIG. 45.

As shown in FIG. 45, the present invention may provide a diversity reception type automobile antenna system comprising a pair of high-frequency pickups 1232 and 1332 which are mounted on two trunk hinges 1086 and 1186 of the vehicle body. Each of these high-frequency pickups 1232 and 1332 is similarly in the form of an electromagnetic coupling type pickup. Since the high-frequency pickups 1232 and 1332 have the same construction and function, only one of them 1232 will be described below with reference to FIG. 46.

The trunk hinge 1086 is pivotally connected at one end with the vehicle body with the other end thereof being rigidly connected with the trunk lid 1088. The pivot end of the trunk hinge 1086 is provided with a torsion bar 1090 for absorbing an impact when the trunk lid 1088 is opened.

As is well-known in the art, a weather strip 1092 is provided to water-tightly seal between the vehicle body and the trunk lid 1088 to prevent rain from penetrating into the vehicle body through a rear window glass 1094.

The high-frequency pickup 1086 is rigidly mounted on the outer or trunk-room side of the trunk hinge 1086 and extends parallel to the length thereof. Thus, a loop antenna 1096 in the high-frequency pickup 1086 will be disposed so that the longitudinal portion thereof extends parallel to the length of the trunk hinge 1086. As a result, the loop antenna 1096 can positively and efficiently catch surface currents flowing on the trunk hinge 1086.

The high-frequency pickup 1086 comprises a casing 1098 of electrically conductive material in which the loop antenna 1096 and associated circuitry 1100 are mounted. The casing 1098 is provided with an opening faced to the trunk hinge 1086. L-shaped fittings 1102 and 1104 are fastened to the opposite ends of the casing 1098 and also rigidly connected with the trunk hinge 1086 by means of screws. As in the previously described embodiments, the loop antenna 1096 in the casing 1098 can detect only a magnetic flux formed by the surface high-frequency currents flowing on the trunk hinge 1086 and is shielded from other external and undesirable fluxes.

The loop antenna 1096 is preferably curved to be compatible with the curvature of the trunk hinge 1086.

The circuitry 1100 is supplied with power and control signals through a cable 1106. Signals received by the loop antenna 1096 are externally fetched through a coaxial cable 1108 and then suitably processed by circuits similar to those used in determining the distribution of surface currents on the vehicle body.

The loop antenna 1096 is similarly in the form of a single-winding coil which is covered with an electrical insulation coating such that the coil can be electrically insulated from and located in close proximity to the trunk hinge 1086. As a result, a magnetic flux formed by the surface currents can efficiently intersect the loop antenna 1096.

FIG. 47 shows a circuit effective to automatically select one of the two high-frequency pickups 1232 and 1332 such that radio or other waves can be received more sensitively by the selected pickup. Such a circuit is similar to those of the previously described embodiments and therefore the description thereof will be omitted.

Figure 48:
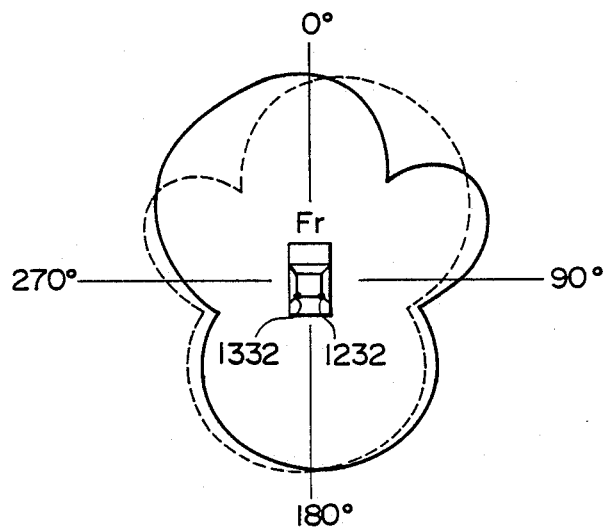
FIG. 48 illustrates directional patterns in the high-frequency pickups mounted on the trunk hinges of the vehicle body.

Since the front pillars 1086 and 1186 are spaced from each other a distance of about 1.5 meters to about 1.8 meters, the space diversity reception type antenna system including the high-frequency pickups 1232 and 1332 is very advantageous in sensitivity with less multipath noise, for FM radio waves having a wavelength equal to about 4 meters. As seen from FIG. 48, this is due to the fact that the directional patterns of the high-frequency pickups 1232 and 1332 are symmetrical relative to each other about the longitudinal axis of the vehicle body.

As will be apparent from the foregoing, the fourth embodiment of the present invention provides a space diversity reception type automobile antenna system comprising a pair of high-frequency pickups disposed to detect surface currents induced on the vehicle body and flowing concentrically on the connections thereof and which has an improved directional pattern with less multi-path noise.

FIFTH EMBODIMENT

The fifth embodiment of the present invention provides a diversity reception type automobile antenna system comprising a pair of high-frequency pickups which are mounted on one of the trunk lid and engine hood of the vehicle body at locations spaced from each other a predetermined distance or alternatively one on each of the trunk lid and engine hood. Each of the high-frequency pickups is positioned near the marginal edge of the above vehicle portion on which surface currents induced by radio or other waves flow concentrically as previously described in connection with FIGS. 8 to 12.

Figure 61:
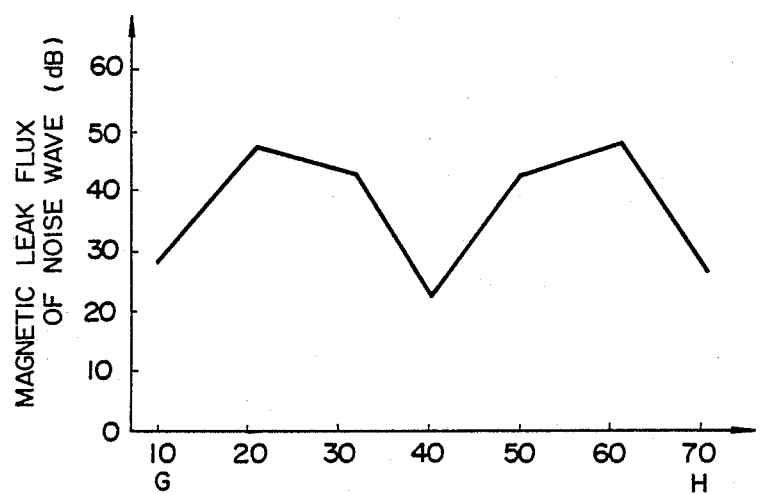
FIG. 61 is a graph showing a distribution of noise currents along a transverse axis G-H in FIG. 8.

FIG. 61 shows a distribution of noise currents on the vehicle body along the transverse line G-H shown in FIG. 8. As seen from this figure, the level of noise currents decreases at the center and ends of the transverse line G-H. If a high-frequency pickup is located on the engine hood at one of the center and sides thereof, the surface high-frequency currents can be detected by this high-frequency pickup with less noise.

Figure 62:
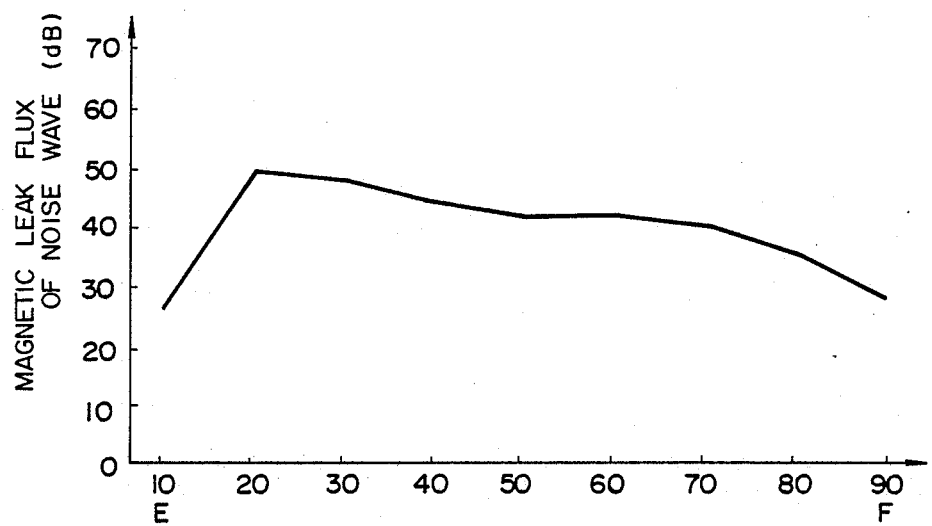
FIG. 62 is a graph showing a distribution of noise currents along a forward section of the longitudinal axis E-F in FIG. 8.

FIG. 62 shows a distribution of noise currents on the engine hood along the section E-F of the longitudinal line shown in FIG. 8. As seen from this figure, the level of the noise currents is minimum at the opposite ends of the section E-F.

Consequently, the high-frequency pickup is preferably located on one of the four corners of the engine hood or the center of the inner edge of the engine hood since it can more efficiently detect the surface high-frequency currents flowing concentrically thereon with less noise.

Figure 50:
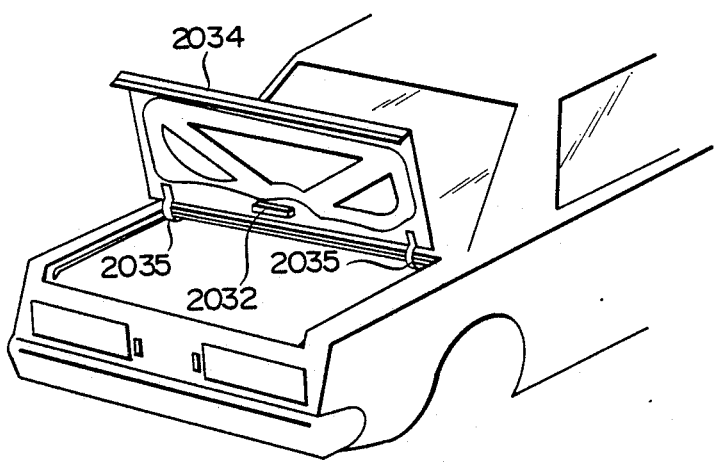
FIG. 50 is a schematic and perspective view of the mounting of the pickup shown in FIG. 49.

Referring to FIG. 50, there is shown a high-frequency pickup 2032 which is of electromagnetic coupling type similar to the probe including the loop coil used in determining the distribution of surface currents on the vehicle body and which is mounted on the trunk lid 2034 near the inner edge thereof.

The inner edge portion of the trunk lid 2034 is pivotally connected to the vehicle body through trunk hinges 2035.

Figure 49:
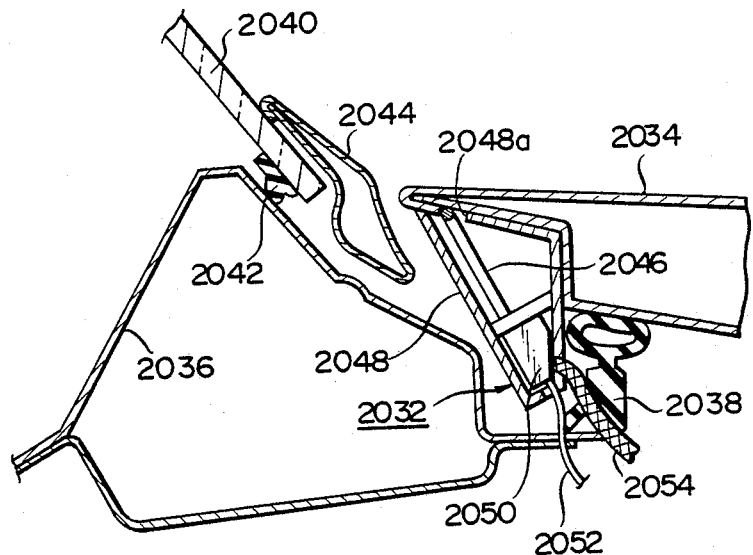
FIG. 49 is a cross-sectional view of a fifth embodiment of an automobile antenna system according to the present invention in which one high-frequency pickup defining a diversity reception antenna is in the form of an electromagnetic coupling type loop antenna mounted on the passenger room side of the trunk lid of the vehicle body at its marginal edge portion.

As seen from FIG. 49, a water-tight weather strip 2038 is provided between the trunk lid 2034 and a rear tray panel 2036 to prevent any external water such as rain from penetrating into the vehicle body through a rear window glass 2040.

A dam 2042 air-tightly seals between the rear window glass 2040 and the rear tray panel 2036 to prevent rain, noise and others from penetrating into the vehicle body. The lower edge of the rear window glass 2040 is covered by a well-known molding 2044.

The high-frequency pickup 2032 is rigidly positioned centrally on the inner edge portion of the trunk lid 2034 opposed to the rear tray panel 2036. The pickup 2032 includes a loop antenna 2046 housed therein and mounted so that the longitudinal portion thereof will be parallel to the marginal edge of the trunk lid 2034.

When the loop antenna 2046 is to be used to receive FM radio waves having a frequency of 80 MHz, it is spaced from the marginal edge of the trunk lid 2034 within a distance of 4.5 cm which can be determined from the aforementioned formula: $12 \times 10^{-3} \lambda(m)$. Thus, the loop antenna 2046 can positively and efficiently detect the surface currents flowing concentrically on the marginal edge of the trunk lid 2034.

Since the surface currents flow along the marginal edge of the trunk lid as seen from FIG. 9, the loop antenna 2046 is arranged so that the longitudinal portion thereof will be parallel to the marginal edge of the trunk lid 2034.

The high-frequency pickup 2032 comprises a casing 2048 of electrically conductive material, in which the loop antenna 2046 and associated circuitry 2050 are housed. The casing 2048 is provided with an opening 2048a faced to the trunk lid 2034.

Therefore, the loop antenna 2046 in the casing 2048 can detect only a magnetic flux formed by the surface high-frequency current flowing on the marginal edge of the trunk lid 2034, but is positively shielded from any other undesirable fluxes by the casing 2048.

The loop antenna 2046 is in the form of a single-winding coil which is curved to be compatible with the curvature of the turned edge of the trunk lid 2034. The coil is covered with an electrical insulation coating such that it can be electrically insulated from and located in close proximity to the trunk lid 2034. As a result, a magnetic flux formed by the surface currents can efficiently intersect the loop antenna 2042.

The circuitry 2050 is supplied with power and control signals through a cable 2052. Signals received by the loop antenna 2046 are externally fetched through a coaxial cable 2054 and then suitably processed by circuits similar to those used in determining the distribution of surface currents as previously described.

Figure 51:
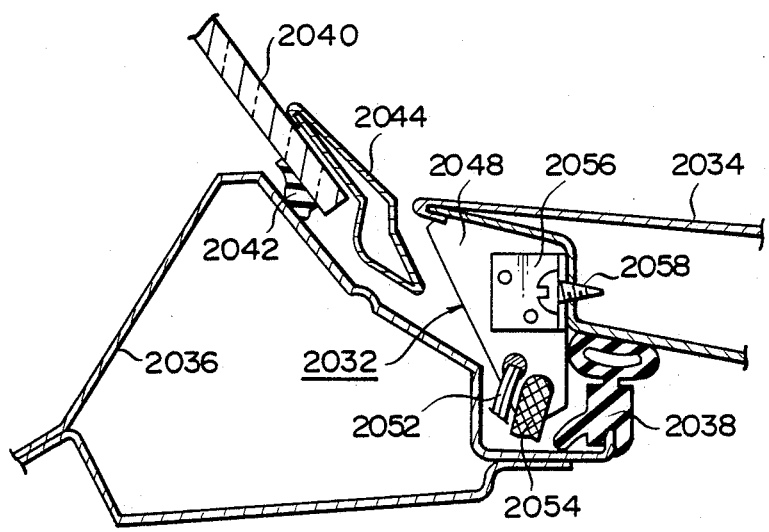
FIG. 51 illustrates the mounting structure of the high-frequency pickup.

FIG. 51 shows the mounting of the high-frequency pickup 2032 on the trunk lid 2034, in which parts similar to those of FIG. 49 are designated by similar reference numerals and the description thereof will be omitted.

In FIG. 51, fittings 2056 are fastened to the casing 2048 of the high-frequency pickup 2032 at the opposite sides as by bolts. Each of the fittings 2056 is rigidly connected with the trunk lid 2034 by means of screws 2058. Thus, the high-frequency pickup 2032 may rigidly be positioned on the inside of the trunk lid 2034.

Figure 52:
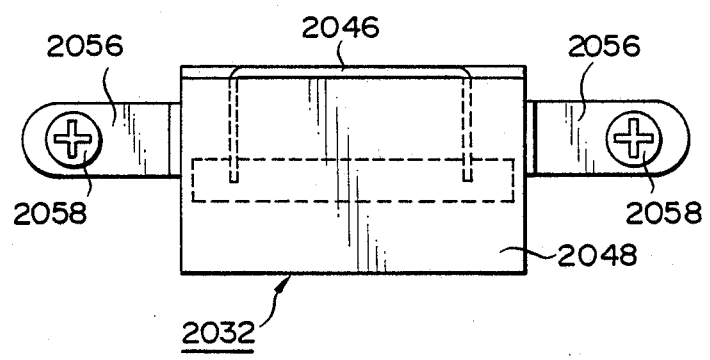
FIG. 52 is a view showing the outline of the high-frequency pickup.
Figure 53:
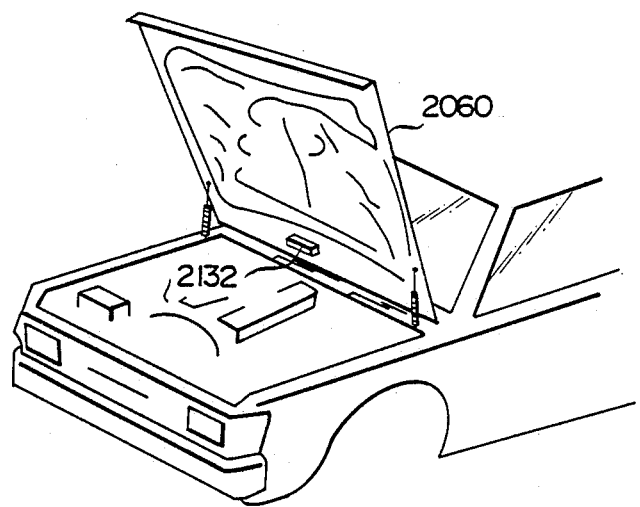
FIG. 53 is a schematic and perspective view showing the mounting of the other high-frequency pickup defining a diversity receiving antenna.

It is thus preferred that the high-frequency pickup 2032 has such a configuration as shown in FIG. 52.

FIGS. 53 to 56 show the other high-frequency pickup 2132 which is mounted on the engine hood of the vehicle body.

Figure 54:
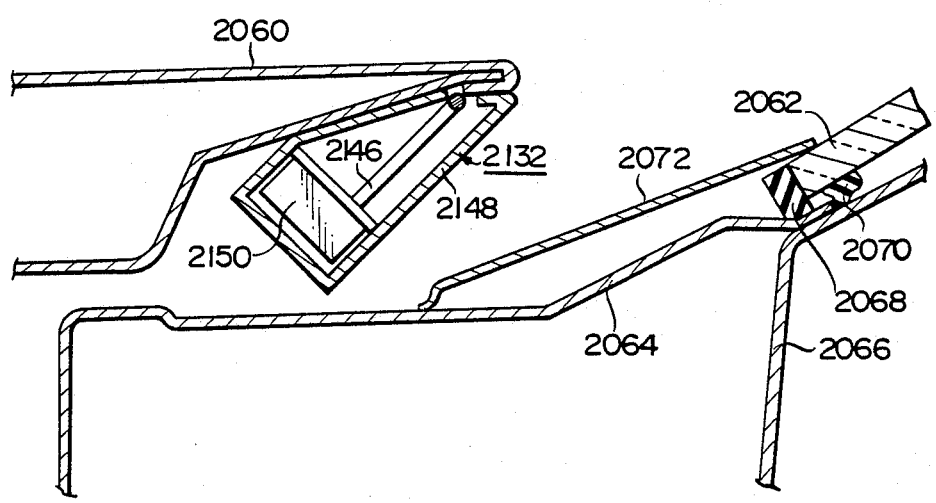
FIG. 54 is a cross-sectional view showing the electromagnetic coupling type high-frequency pickup mounted on the passenger room side of the engine hood at its marginal portion.

Referring to FIG. 54, the engine hood 2060 is pivotally connected at one edge with the vehicle body. when the engine hood 2060 is in its closed position, the marginal edge thereof on the side of a windshield glass 2062 is faced to a front outer panel 2064. The edge of the front outer panel 2064 faced to the side of the passenger room is connected with a front inner panel 2066. The windshield glass 2062 is supported on the front outer panel 2064 by a stopper 2068. Further, a dam 2070 is provided between the windshield glass 2062 and the front inner panel 2066 to prevent any external water such as rain from penetrating into the vehicle body. The lower edge of the windshield glass 2062 is covered by a molding 2072 as is well-known in the art.

The high-frequency pickup 2132 is similar to the high-frequency pickup 2032. Parts similar to those of the pickup 2032 are denoted by similar reference numerals added by 2100.

The high-frequency pickup 2132 is spaced from the inner edge of the engine hood 2060 inwardly within a range of 4.5 cm. Therefore, this high-frequency pickup 2132 can positively detect the surface high-frequency currents flowing concentrically on the marginal edge of the engine hood with less noise.

Figure 55:
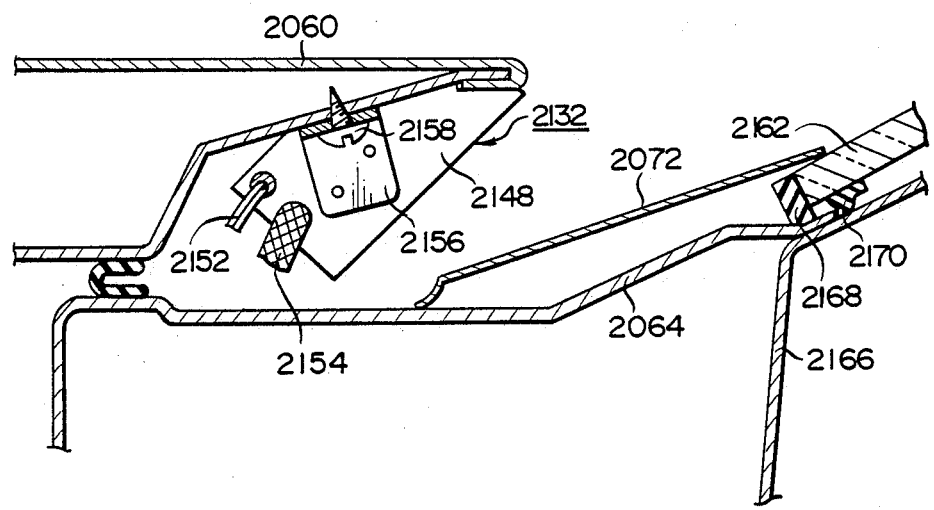
FIG. 55 illustrates the mounting of the high-frequency pickup.
Figure 56:
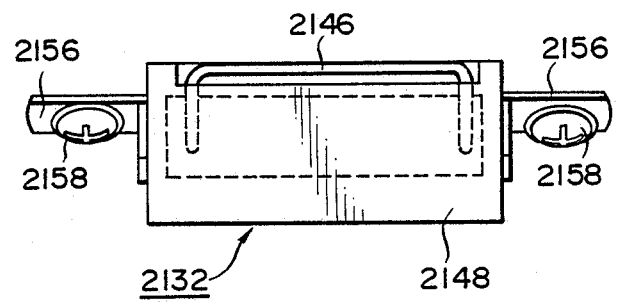
FIG. 56 is a view showing the outline of the high-frequency pickup.

FIG. 55 shows the mounting of the high-frequency pickup 2132 mounted on the engine hood 2060 while FIG. 56 illustrates the outline of the high-frequency pickup 2132 mounted on the engine hood 2060. The structure and configuration are similar to those of the first embodiment and therefore will not further be described.

It is however noted that the position of the high-frequency pickup may not interfere with the motion of wiper blades.

Figure 57:
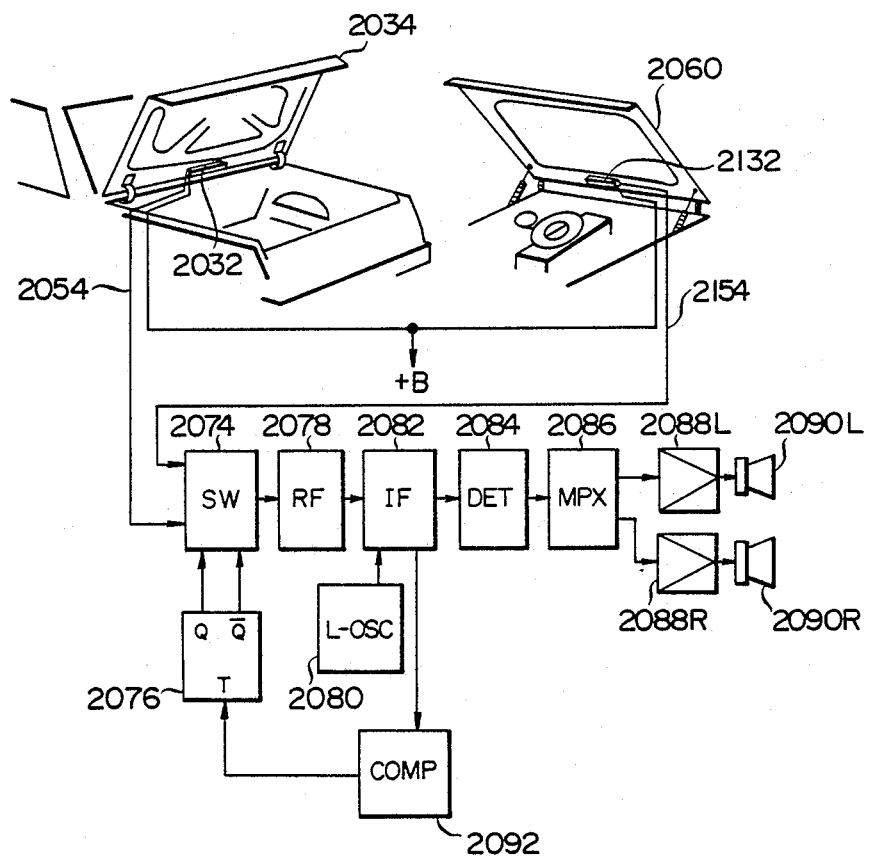
FIG. 57 is a circuit diagram of the automobile antenna system shown in FIGS. 49 through 56.

FIG. 57 shows a circuit which is effective to automatically select one of the high-frequency pickups 2032 and 2132 such that radio or other waves can be received more sensitively by the selected pickup.

Each of the high-frequency pickups 2032 and 2132 is electrically connected with a switching circuit 2074 through a coaxial cable 2054 or 2154. The switching circuit 2074 is actuated on receiving output signals from a T-shaped flip flop 2076 which will be described. When the switching circuit 2074 is actuated, one of the high-frequency pickups 2032 and 2132 is selected with its output signals being supplied to a high-frequency amplifier 2078. Output signals from the high-frequency amplifier 2078 are then supplied to a detector circuit 2084 through an intermediate frequency amplifying circuit 2082 which also is coupled with a local oscillator circuit 2080. At the detector circuit 2084, only voice signals are externally fetched. The fetched voice signals are divided into left-hand and right-hand components which in turn are transmitted to left and right speakers 2090L and 2090R through left and right amplifiers 2088L and 2088R, respectively.

Output signals from the intermediate frequency amplifier circuit 2082 are compared with a reference value by a comparator 2092. If an output signal from the intermediate frequency amplifier 2082, when either of the high-frequency pickup 2032 or 2132 has its sensitivity reduced below a predetermined level, is smaller than the reference value, the comparator 2092 then generates a trigger signal which in turn is supplied to the T-shaped flip flop 2096. At this time, the output of the flip flop 2096 is inverted.

This inversion of output causes the switching circuit 2074 to actuate such that one of the high-frequency pickups will be changed to the other to receive radio or other waves more sensitively.

Figure 58:
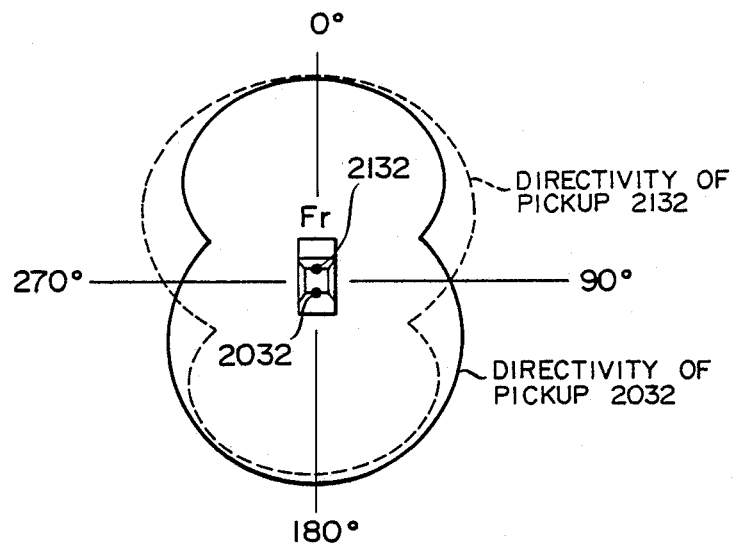
FIG. 58 illustrates directional patterns in the high-frequency pickups of the automobile antenna system shown in FIGS. 49 through 57.
Figure 60:
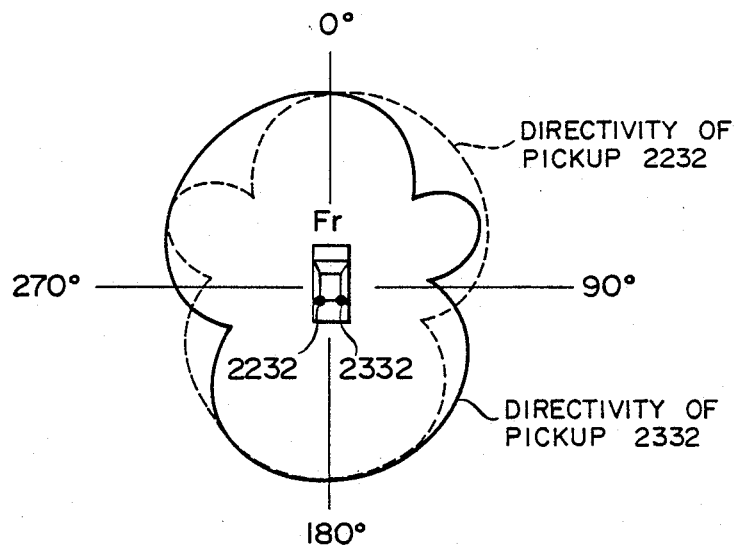
FIG. 60 illustrates directional patterns of the high-frequency pickups shown in FIG. 59.

In such a manner, the two high-frequency pickups 2032 and 2132 together define a diversity reception type antenna which can always receive radio or other waves more sensitively. As seen from FIG. 58, this is due to the fact that the directional pattern of one of the high-frequency pickups 2032 and 2132 can be complemented by that of the other high-frequency pickup. At the same time, the diversity receiving system reduces multi-path noise.

Figure 59:
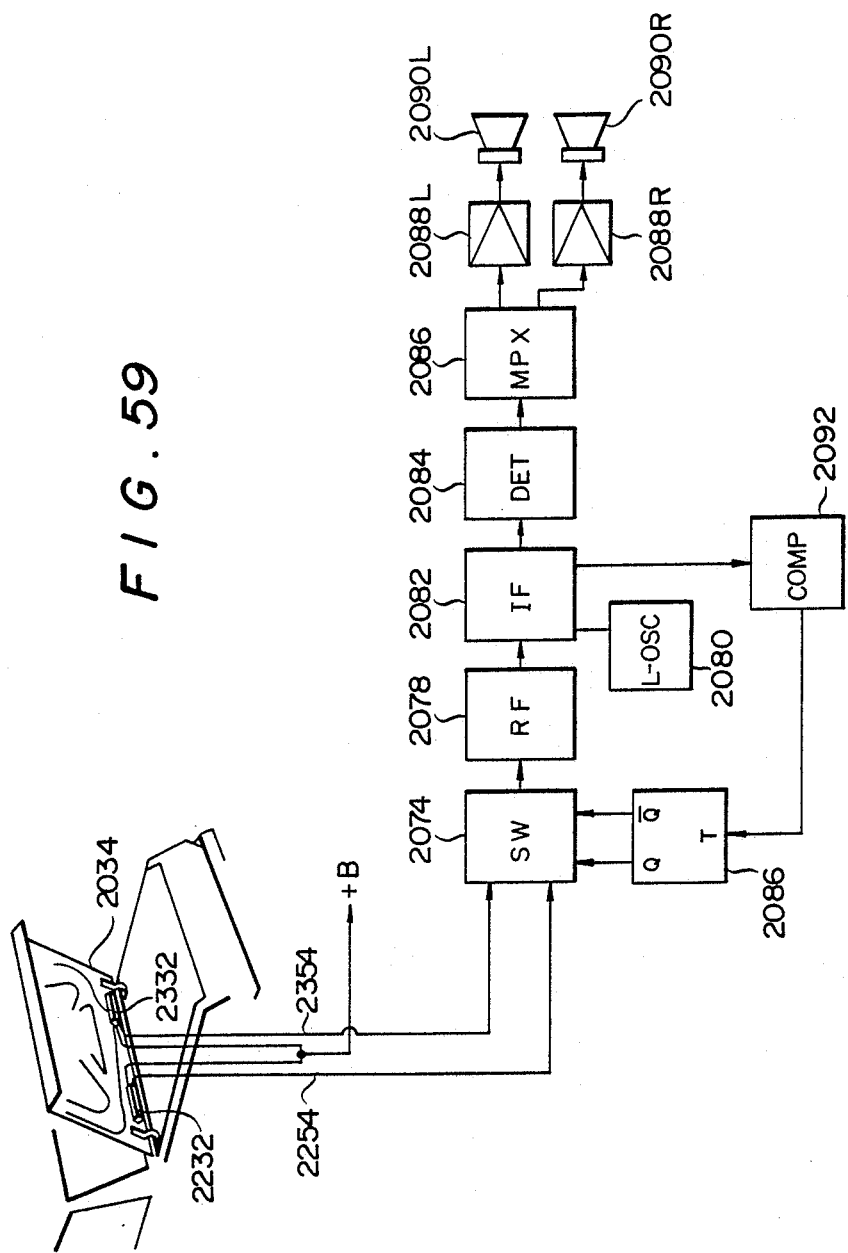
FIG. 59 is a circuit diagram of a modification of the automobile antenna system shown in FIGS. 49 through 58.

In accordance with the present invention, as shown in FIG. 59, a diversity reception type antenna system may comprise a pair of high-frequency pickups 2232 and 2332 which are mounted on the trunk lid 2034 near the inner edge thereof and spaced from each other along the inner edge of the trunk lid 2034. Such an arrangement has the same advantages as in the previously mentioned embodiments since the directional pattern of one of the high-frequency pickups can be complemented by that of the other high-frequency pickup.

In such a manner, the fifth embodiment provides an improved automobile antenna system which can operate as a diversity receiving system with its improved directional pattern and with less multi-path noise. Moreover, the position of the antenna system permits the installation and maintenance to facilitate.

SIXTH EMBODIMENT

The sixth embodiment of the present invention provides a diversity reception type automobile antenna system comprising a pair of high-frequency pickups which are located on the vehicle body at different locations and adapted to efficiently receive surface high-frequency currents induced on the vehicle body by radio or other waves and flowing concentrically on the marginal edge portions of the vehicle body. One of the high-frequency pickups may automatically be selected such that radio or other waves can more sensitively be received by the selected pickup.

In such an arrangement, the diversity reception type automobile antenna system will not be changed in antenna characteristics even when the wiper device is actuated and can provide an improved diversity effect without any externally extending portion.

Figure 73:
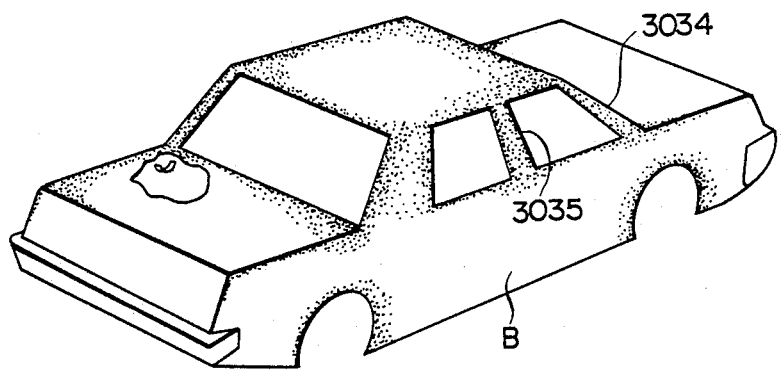
FIG. 73 illustrates a distribution of intensity in the surface currents.
Figure 74:
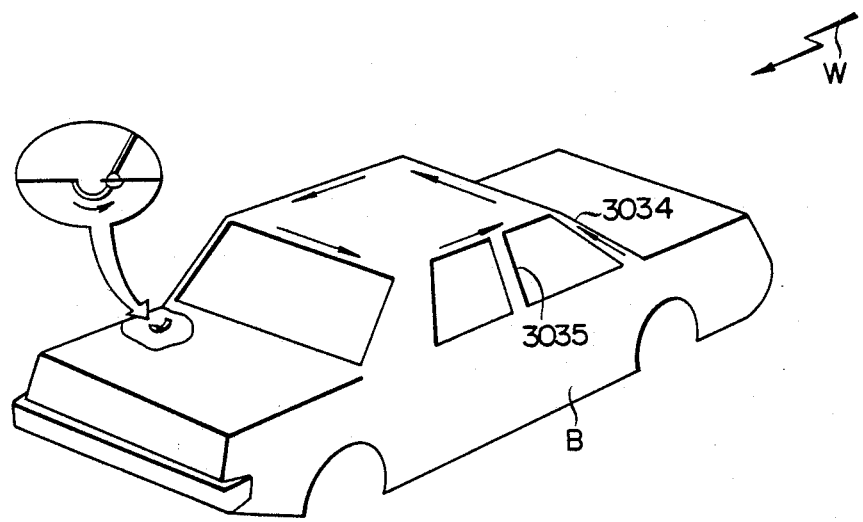

Referring to FIGS. 73 74 and 74A, there are shown the magnitude and orientation of surface high-frequency currents induced on the vehicle body at various locations by radio or other waves having a frequency of 80 MHz and determined by a simulation of computer and actual measurements of the aforementioned probe P. As seen from FIG. 73, the magnitude of the surface currents is higher along the marginal edge of each of flat vehicle portions and very low at the center thereof. As seen from FIGS. 74 and 74A, furthermore, the surface currents concentrically flow parallel to the marginal edge of each vehicle portions and along the connections between each adjacent portions of flat configuration.

Figure 63:
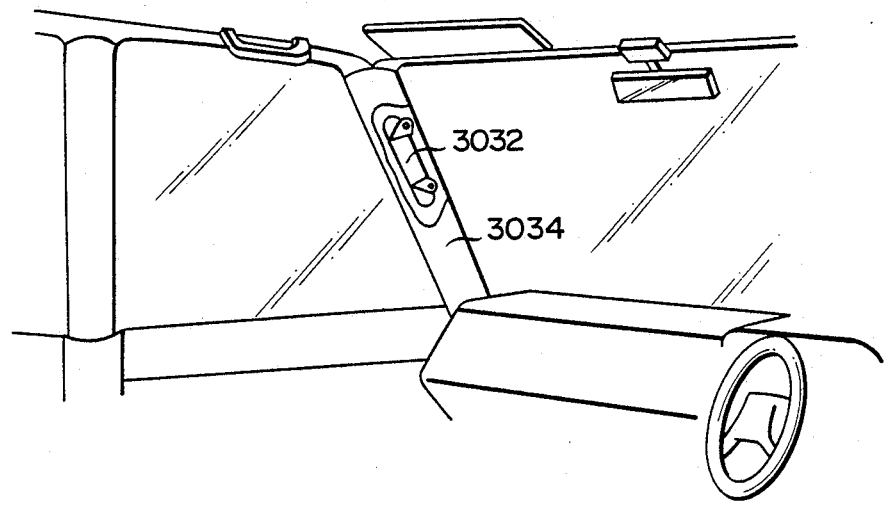
FIG. 63 is a perspective view showing a sixth embodiment of an automobile antenna system according to the present invention in which one high-frequency pickup is mounted on one of the front pillars on the vehicle body.
Figure 64:
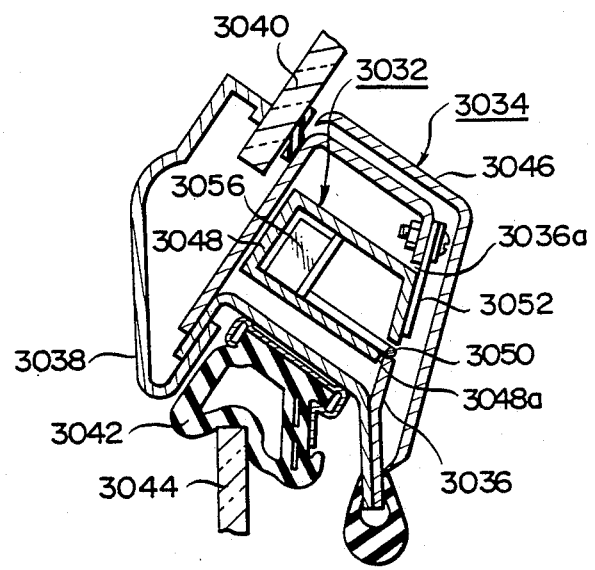
FIG. 64 is a cross-sectional view showing an electromagnetic coupling type high-frequency pickup which is mounted on the front pillar shown in FIG. 63.
Figure 65:
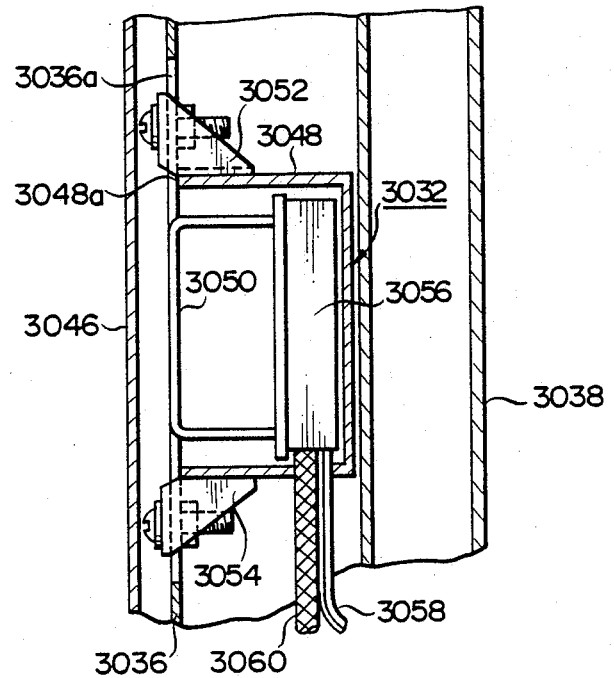
FIG. 65 is a longitudinal section of the primary parts shown in FIG. 64.

Referring to FIGS. 63 to 65, there is shown one of the high-frequency pickups 3032 which is mounted on the front right-hand pillar 3034. As seen best from FIG. 64, the front pillar 3034 includes a pillar leg plates 3036 which is a hollow column of quadrilateral configuration. The outer side of the pillar leg plate 3036 supports a windshield molding 3038 which in turn holds a windshield glass 3040.

The rearward side of the pillar leg plate 3036 supports a weather strip 3042 of rubber which watertightly seals between the pillar leg plate 3036 and a side glass 3044.

Further, the inner side of the pillar leg plate 3036 supports a front pillar garnish 3046 which conceals the surface of the pillar leg plate 3036 to provide an aesthetic appearance.

The high-frequency pickup 3032 is mounted in the front pillar to extend parallel to the length thereof. In the sixth embodiment, the high-frequency pickup 3032 is in the form of an electromagnetic coupling type pickup which is housed within the interior of the pillar leg plate 3036.

As seen from FIGS. 64 and 65, the high-frequency pickup 3032 comprises a casing 3048 of electrically conductive material and a loop antenna 3050 housed within the casing 3048 such that the loop antenna 3050 can be shielded from any external and undesirable fluxes. The casing 3048 is provided with an opening 3048a through which a portion of the loop antenna 3050 is externally exposed. The exposed portion of the loop antenna 3050 is thus disposed in close proximity to the pillar leg plate 3036 on which the surface high-frequency currents flow concentrically as previously described.

The pillar leg plate 3036 is provided with an opening 3036a through which the high-frequency pickup 3032 is inserted into the interior of the pillar leg plate 3036 before a front pillar garnish 3046 is mounted on the pillar leg plate 3036.

Brackets 3052 and 3054 are fastened to the casing 3048 at the opposite ends thereof as by spot-welding and also fastened to the pillar leg plate 3036 by means of screws as shown. As a result, the high-frequency pickup 3032 may be rigidly connected with the pillar leg plate 3036.

In such an arrangement, the loop antenna 3050 is disposed in close proximity to the edge of the opening 3036a in the pillar leg plate 3036 so that a magnetic flux formed by the surface high-frequency currents flowing concentrically on the pillar leg plate 3036 can efficiently intersect the loop antenna 3050.

The casing 3048 also contains a circuitry 3056 including pre-amplifier means and others, which is positioned behind the loop antenna 3050. The circuitry 3056 is supplied with power and control signals through a cable 3058. Signals received by the loop antenna 3050 are externally fetched through a coaxial cable 3060 and then suitably processed by circuits similar to those used in determining the distribution of surface currents on the vehicle body as previously described.

The loop antenna 3050 is in the form of a single-winding coil which is covered with an electrical insulation coating such that the coil can be electrically insulated from and located in close proximity to the marginal edge of the pillar leg plate 3036. Thus, a magnetic flux formed by the surface high-frequency currents flowing concentrically on the pillar can efficiently intersect the loop antenna 3050.

After the high-frequency pickup 3032 has been mounted in the interior of the front pillar 3034, the front pillar garnish 3046 is mounted on the pillar 3034 to provide an appearance which is not different from those of the conventional pillar structures.

Figure 66:
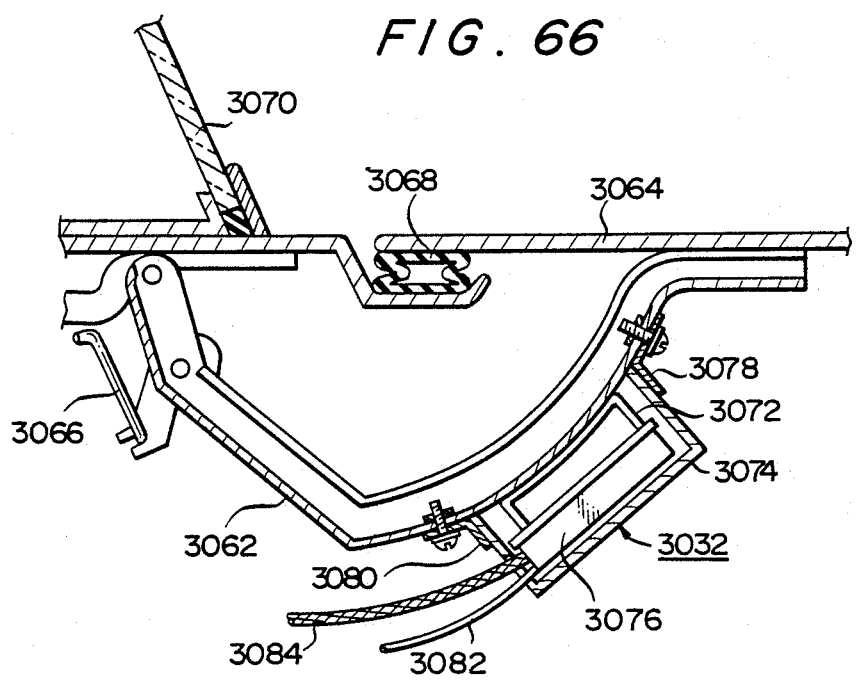
FIG. 66 is a cross-sectional view of the other high-frequency pickup defining a diversity antenna which is mounted on one of the trunk hinges.
Figure 67:
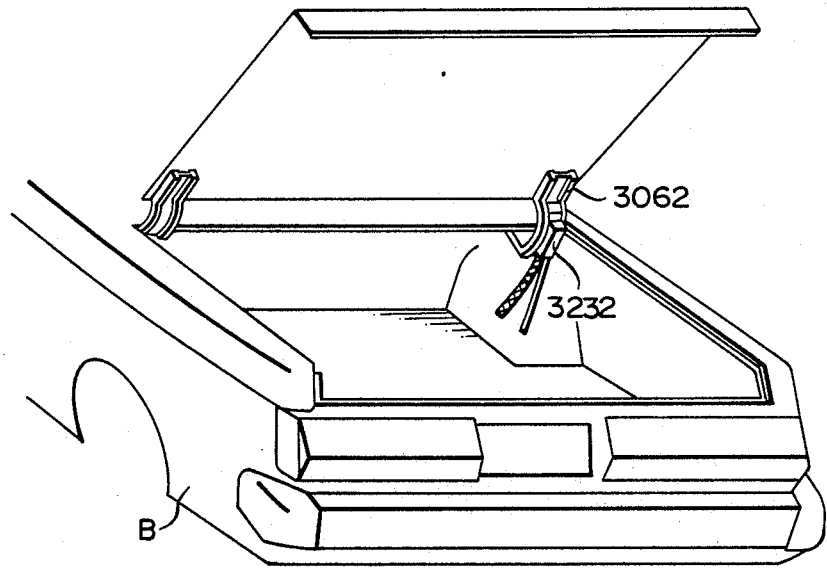
FIG. 67 is a schematic and perspective view showing the mounting of the pickup shown in FIG. 66.

Since the trunk hinge is remote from the engine and not very influenced by noise, detected currents can provide signals which are superior in quality and S/N ratio. In the sixth embodiment, therefore, the other high-frequency pickup 3232 is mounted on one of the trunk hinges 3062, as shown in FIGS. 66 and 67.

The high-frequency pickup 3232 is similarly in the form of an electromagnetic coupling type pickup similar to the probe which includes the loop coils used in determining the distribution of surface currents on the vehicle body.

The trunk hinge 3062 is pivotally connected at one end with the vehicle body with the other end thereof being rigidly fastened to the trunk lid 3064. The pivotal end of the trunk hinge 3062 is provided with a torsion bar 3066 which functions to absorb an impact produced when the trunk lid 3064 is opened. As is well-known in the art, a water-tight weather strip 3068 is provided to seal between the trunk lid 3064 and the vehicle body to prevent any external water such as rain from penetrating into the vehicle body through a rear window glass 3070.

The high-frequency pickup 3232 is mounted on the trunk hinge 3062 at the outer or trunk-room side thereof such that the longitudinal portion of the loop antenna 3072 will extend parallel to the length of the trunk hinge 3062. Thus, the loop antenna 3072 can positively and efficiently detect the surface currents flowing on the trunk hinge 3062.

The high-frequency pickup 3232 comprises a casing 3074 of electrically conductive material in which the loop antenna 3072 and associated circuitry 3076 are housed. The casing 3074 is provided with an opening 3062 faced to the trunk hinge 3062. L-shaped fittings 3078 and 3080 are fastened to the casing 3074 at the opposite ends thereof and also to the trunk hinge 3062 by means of screws. Therefore, the high-frequency pickup 3232 may rigidly be fastened to the trunk hinge 3062. The loop antenna 3072 can detect only a magnetic flux formed by the surface high-frequency currents flowing on the trunk hinge 3062, and can also be positively shielded from any external and undesirable fluxes by the casing 3074.

The loop antenna 3072 is preferably curved to be compatible with the curvature of the trunk hinge 3062.

The circuitry 3076 is supplied with power and control signals through a cable 3082. Signals received by the loop antenna 3072 are externally fetched through a coaxial cable 3084 and then suitably processed by circuits similar to those used in determining the distribution of surface currents on the vehicle body.

The loop antenna 3072 is similarly in the form of a single-winding coil which is covered with an electrical insulation layer such that the coil can be electrically insulated from and located in close proximity to the trunk hinge 3062. As a result, a magnetic flux formed by the surface currents can efficiently intersect the loop antenna.

Figure 68:
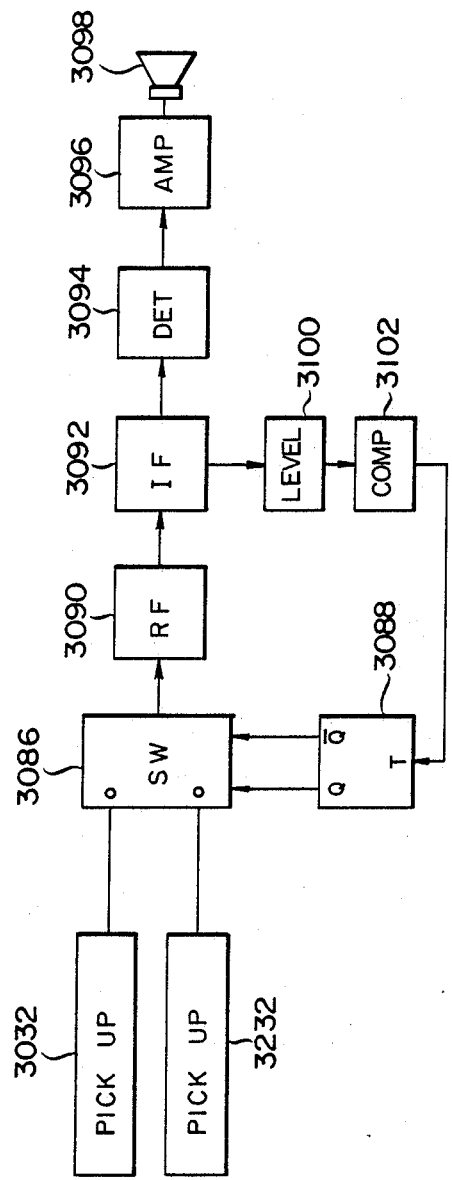
FIG. 68 is a circuit diagram of the automobile antenna system.

FIG. 68 shows a circuit which is effective to automatically select one of the high-frequency pickups 3032 and 3232, which are mounted respectively on the front pillar and trunk hinge 3034, 3062, such that radio or other waves can be received by the selected pickup more sensitively.

In FIG. 68, a switching circuit 3086 is electrically connected with both the high-frequency pickups 3032 and 3232. The switching circuit 3086 is actuated on receiving output signals from a T-shaped flip flop 3088 which will be described as a conditioning circuit.

When the switching circuit 3086 is actuated, one of the high-frequency pickups 3032 and 3232 is selected with its output signals being supplied to an intermediate frequency amplifier circuit 3092 through a high-frequency amplifier circuit 3090. Output signals from the intermediate frequency amplifier circuit 3092 are supplied to a detector circuit 3094 at which only voice signals are fetched. Voice signals are then supplied to a speaker 3098 through an amplifier 3096.

Output signals from the intermediate frequency amplifying circuit 3092 are detected with respect to its level by a level detector 3100. On the other hand, a subsequent level comparator 3102 is set to have a threshold indicative of an output signal from the intermediate frequency amplifying circuit 3092 if either of the high-frequency pickup 3032 or 3232 has its sensitivity lowered below a predetermined level. The level of the output signal from the level detector 3100 is compared with said threshold at the level comparator 3102. If the level is smaller than said threshold, the level comparator 3102 then generates a trigger signal which in turn is supplied to the T-shaped flip flop 3088. Therefore, the output of the T-shaped flip flop 3088 is inverted to actuate the switching circuit 3086. As a result, one of the high-frequency pickups 3032 and 3232 is selected such that radio or other waves can be received by the selected pickup more sensitively. Received signals are then supplied to the high-frequency amplifying circuit 3090.

In such a manner, the high-frequency pickups 3032 and 3232 respectively mounted on the front pillar and trunk hinge 3034, 3062 together define a diversity receiving system which can improve the directional pattern of the entire antenna system.

Figure 69:
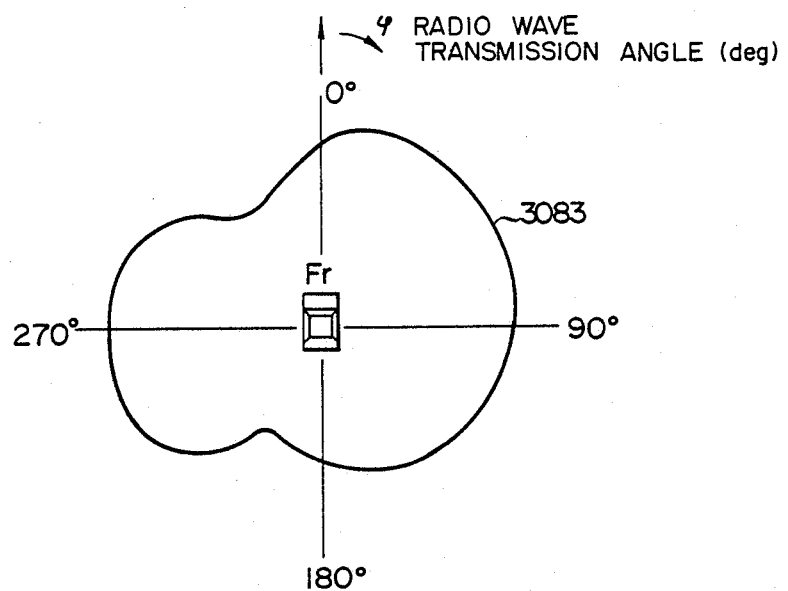
FIG. 69 illustrates the directional pattern of the high-frequency pickup mounted on the front pillar.
Figure 70:
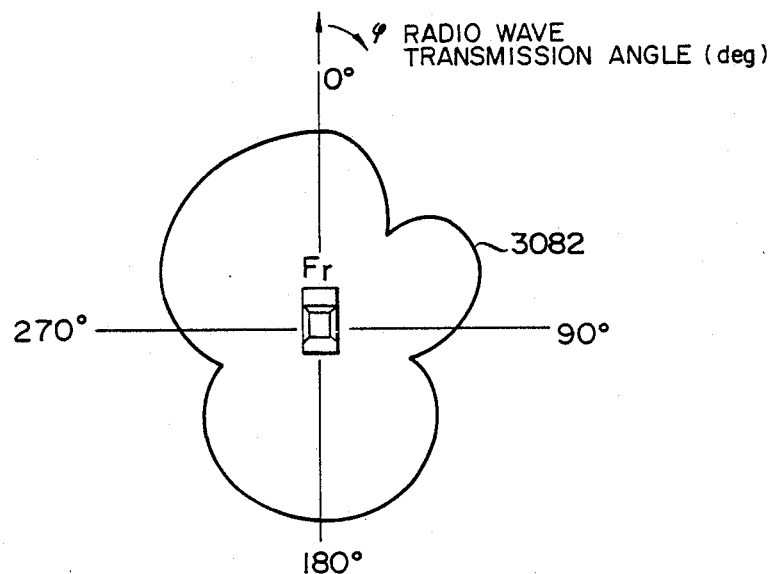
FIG. 70 illustrates the directional pattern of the high-frequency pickup mounted on the trunk hinge.
Figure 71:
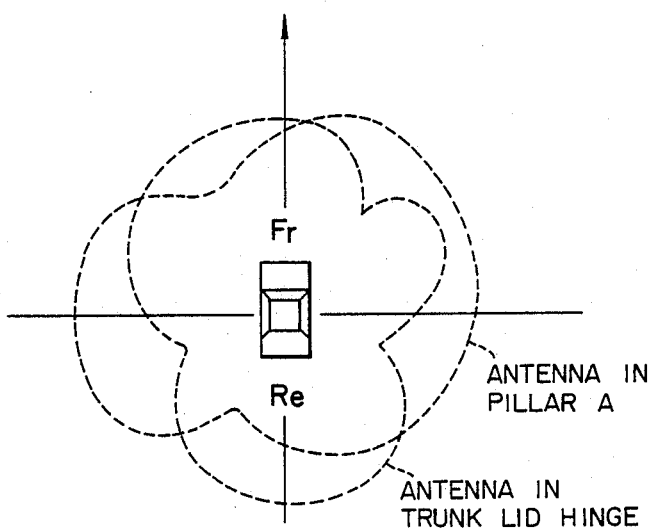
FIGS. 71 and 72 illustrate such a state that both the high-frequency pickups are complemented with each other to provide a higher sensitivity.
Figure 72:
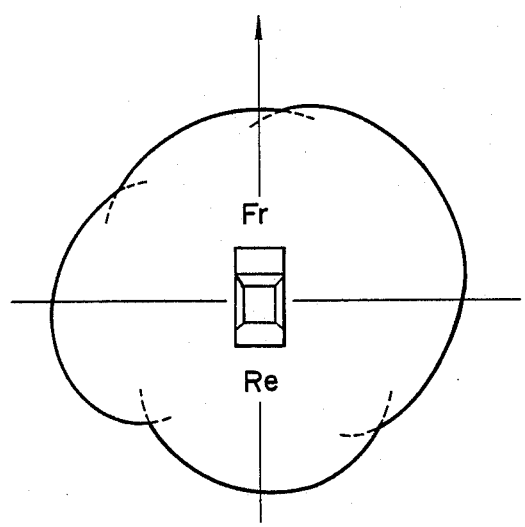

The high-frequency pickup 3032 mounted on the front pillar 3034 has a direction pattern as shown in FIG. 69 while the high-frequency pickup 3232 on the trunk hinge 3062 has a directional pattern as shown in FIG. 70. As seen from FIGS. 71 and 72, therefore, the high-frequency pickups 3032 and 3232 can be complemented by each other with respect to sensitivity to improve the directivity of the antenna system.

The high-frequency pickup 3032 on the front pillar 3034 is remote from the wiper blades (not shown). When the wiper is operated, therefore, the characteristics of the high-frequency pickup 3032 will not adversely be affected by the motion of the wiper.

In accordance with the present invention, the automobile antenna system is not subject to being damaged or stolen since it does not need to use any externally extending member such as a pole antenna.

We claim:

1. A diversity type automobile vehicle antenna system comprising:
   first high-frequency pickup means including a loop antenna mounted so that one side of the loop antenna faces a first marginal edge portion on the vehicle body for receiving broadcast waves by detecting high-frequency currents induced on the vehicle body by the broadcast waves;
   second high-frequency pickup means including a loop antenna mounted so that one side of the loop antenna faces a second marginal edge portion on the vehicle body, the second marginal edge portion being spaced apart from the first marginal edge portion, for receiving broadcast waves by detecting high-frequency currents induced on the vehicle body by the broadcast waves; and
   pickup selection means for switchably selecting an output from any one of said first and second high-frequency pickup means, said pickup selection means comparing the selected output to be a predetermined threshold limit and switching to the other output of said first and second high frequency pickup means when the selected output is lower than the predetermined threshold.

2. A diversity type automobile antenna system as in claim 1 said first high-frequency pickup means being mounted on a rearward edge of the vehicle rear roof at the rightward or leftward side of the vehicle body and extending parallel to the marginal edge portion of the rear roof and said second high-frequency pickup means being mounted on a front pillar of the vehicle body on the same side as said first high-frequency pickup means and extending parallel to the length of the front pillar.

3. A diversity type automobile antenna system as in claim 2, said first high-frequency pickup means being mounted on a roof panel of the vehicle body and separated from a rear window frame on said roof panel and said first high-frequency pickup means including the loop antenna located in close proximity to the marginal edge portion of an edge molding mounting retainer and extending parallel to the length thereof, said retainer having a longitudinal dimension substantially equal to the wavelength of broadcast waves to be received.

4. A diversity type automobile antenna system as in claim 1 said first high-frequency pickup means being mounted on an inner edge of a trunk lid of the vehicle body and at the center thereof and extending parallel to the inner edge of the trunk lid and said second high-frequency pickup means being mounted on a front pillar of the vehicle body and extending parallel to the length of the front pillar.

5. A diversity type automobile antenna system as in claim 4, said first high-frequency pickup means being spaced from a marginal edge portion of the trunk lid inwardly within a range represented by the following formula:

$$12 \times 10^{-3} \, c/f \text{ (meter)}$$

where c is the velocity of light and f is the carrier frequency of the broadcast waves to be received.

6. A diversity type automobile antenna system as in claim 1 said first and second high-frequency pickup means being mounted on a roof panel of the vehicle adjacent to a marginal edge portion thereof at different locations, respectively, and extending parallel to the marginal edge portion of the roof panel.

7. A diversity type automobile antenna system as in claim 6, said first and second high-frequency pickup means being mounted on the marginal edge of the roof panel adjacent to the rear window glass of the vehicle body and spaced from each other a predetermined distance.

8. A diversity type automobile antenna system as in claim 6, one of said first and second high-frequency pickup means being mounted on the marginal edge portion of the roof panel adjacent to the rear window glass, the other of said first and second high-frequency pickup means being mounted on the marginal edge portion of the roof panel adjacent to a windshield glass of the vehicle body.

9. A diversity type automobile antenna system as in claim 1, said first and second high-frequency pickup means being respectively mounted in two front pillars of the vehicle body, spaced apart from each other.

10. A diversity type automobile antenna system as in claim 1, said first and second high-frequency pickup means being respectively mounted on two trunk hinges of the vehicle body, spaced apart from each other.

11. A diversity type automobile antenna system as in claim 1, said first and second high-frequency pickup means being respectively mounted on any one of a trunk lid and engine hood of the vehicle body, with a predetermined spacing between marginal edge portions thereof and with a predetermined spacing between said first and second high-frequency pickup means or alternatively mounted respectively on the marginal edge portions of the trunk lid and engine hood.

12. A diversity type automobile antenna system as in claim 1 said first and second high-frequently pickup means being mounted marginal edge portions of the vehicle body, at different locations thereof and extending parallel to the marginal edge portions of the vehicle body.

13. A diversity type automobile vehicle antenna system comprising:
first high-frequency pickup means mounted on a rearward edge of the vehicle rear roof at the rightward or leftward side of the vehicle body and extending parallel to the marginal edge portion of the rear roof for receiving broadcast waves by detecting high-frequency currents induced on the vehicle body by the broadcast waves;
second high-frequency pickup means mounted on a front pillar of the vehicle body on the same side as said first high-frequency pickup means and extending parallel to the length of the front pillar, for receiving broadcast waves by detecting high-frequency currents induced on the vehicle body by the broadcast waves; and
pickup selection means for switchably selecting an output from any one of said first and second high-frequency pickup means, said pickup selection means comparing the selected output to a predetermined threshold limit and switching to the other output of said first and second high frequency pickup means when the selected output is lower than the redetermined threshold 14. A diversity type automobile antenna system as in claim 13, said first high-frequency pickup means being mounted on a roof panel of the vehicle body and separated form a rear window frame on said roof panel and said first high-frequency pickup means including a loop antenna located in close proximity to the marginal edge portion of an edge molding mounting retainer and extending parallel to the length thereof, said retainer having a longitudinal dimension substantially equal to the wavelength of broadcast waves to be received.

15. A diversity type automobile antenna system as in claim 13, said second high-frequency pickup means including a loop antenna mounted on the pillar and extending parallel to the length thereof, said loop antenna being adapted to electromagnetically detect a magnetic flux formed by the high-frequency currents flowing on the pillar.

16. A diversity type automobile antenna system as in claim 13, said second high-frequency pickup means including a detecting electrode disposed in close proximity to the pillar and extending parallel to the length thereof, the pillar and detecting electrode comprising an electrostatic coupling for detecting the high-frequency currents flowing on the pillar.

17. A diversity type automobile vehicle antenna system comprising:
first high-frequency pickup means mounted on an inner edge of a trunk lid of the vehicle body and at the center thereof and extending parallel to the inner edge of the trunk lid for receiving broadcast waves by detecting high-frequency currents induced on the vehicle body by the broadcast waves;
second high-frequency pickup means mounted on a front pillar of the vehicle body and extending parallel to the length of the front pillar, for receiving broadcast waves by detecting high-frequency current induced on the vehicle body by the broadcast waves; and
pickup selection means for switchable selecting an output from any one of said first and second high-frequency pickup means, said pickup selection means comparing the selected output to a predetermined threshold limit and switching to the other output of said first and second high frequency pickup means when the selected output is lower than the predetermined threshold.

18. A diversity type automobile antenna system as in claim 17, said first high-frequency pickup means being spaced from a marginal edge portion of the trunk lid inwardly within a range represented by the following formula:

$$12 \times 10^{-3} \, c/f \text{ (meter)}$$

where c is the velocity of light and f is the carrier frequency of the broadcast waves to be received.

19. A diversity type automobile antenna system as in claim 17, said second high-frequency pickup means including a loop antenna extending along the front pillar, said loop antenna being adapted to electromagnetically detect a magnetic flux formed by the high-frequency currents flowing on the front pillar.

20. A diversity type automobile antenna system as in claim 17, said second high-frequency pickup means including a detecting electrode disposed in close proximity to the front pillar and extending parallel to the length thereof, the front pillar and detecting electrode comprising an electrostatic coupling for detecting the high-frequency currents flowing on the pillar.

21. A diversity type automobile vehicle antenna system comprising:
   first high-frequency pickup means mounted at a first marginal edge portion of the vehicle body for receiving broadcast waves by detecting high-frequency currents induced on the vehicle body by the broadcast waves;
   second high-frequency pickup means mounted at a second marginal edge portion of the vehicle body, the second marginal edge portion being spaced apart from first marginal edge portion, for receiving broadcast waves by detecting high-frequency currents induced on the vehicle body by the broadcast waves; and
   pickup selection means for switchably selecting an output from any one of said first and second high-frequency pickup means, said pickup selection means comparing the selected output to a predetermined threshold limit and switching to the other output of said first and second high frequency pickup means when the selected output is lower than the predetermined threshold;
   said first and second high-frequency pickup means being mounted on a roof panel of the vehicle adjacent to a marginal edge portion thereof at different location, respectively, and extending parallel to the marginal edge portion of the roof panel.

22. A diversity type automobile antenna system as in claim 21, said first and second high-frequency pickup means being mounted on the marginal edge of the roof panel adjacent to the rear window glass of the vehicle body and spaced from each other a predetermined distance.

23. A diversity type automobile antenna system as in claim 21, one of said first and second high-frequency pickup means being mounted on the marginal edge portion of the roof panel adjacent to the rear window glass, the other of said first and second high-frequency pickup means being mounted on the marginal edge portion of the roof panel adjacent to a windshield glass of the vehicle body.

24. A diversity type automobile vehicle antenna system comprising:
   first high-frequency pickup means mounted at a first marginal edge portion of the vehicle body for receiving broadcast waves by detecting high-frequency currents induced on the vehicle body by the broadcast waves;
   second high-frequency pickup means mounted at a second marginal edge portion of the vehicle body, the second marginal edge portion being spaced apart from the first marginal edge portion, for receiving broadcast waves by detecting high-frequency currents induced on the vehicle body by the broadcast waves; and
   pickup selection means for switchably selecting an output from any one of said first and second high-frequency pickup means, said pickup selection means comparing the selected output to a predetermined threshold limit and switching to the other output of said first and second high frequency pickup means when the selected output is lower than the predetermined threshold;
   said first and second high-frequency pickup means being, respectively, mounted in two front pillars of the vehicle body, spaced apart from each other.

25. A diversity type automobile vehicle antenna system comprising:
   first high-frequency pickup means mounted at a first marginal edge portion of the vehicle body for receiving broadcast waves by detecting high-frequency currents induced on the vehicle body by the broadcast waves;
   second high-frequency pickup means mounted at a second marginal edge portion of the vehicle body, the second marginal edge portion being spaced apart from the first marginal edge portion, for receiving broadcast waves by detecting high-frequency currents induced on the vehicle body by the broadcast waves; and
   pickup selection means for switchably selecting an output from any one of said first and second high-frequency pickup means, said pickup selection means comparing the selected output to a predetermined threshold limit and switching to the other output of said first and second high frequency pickup means when the selected output is lower than the predetermined threshold;
   said first and second high-frequency pickup means being, respectively, mounted on two trunk hinges of the vehicle body, spaced apart from each other.

26. A diversity type automobile vehicle antenna system comprising:
   first high-frequency pickup means mounted at a first marginal edge portion of the vehicle body for receiving broadcast waves by detecting high-frequency currents induced on the vehicle body by the broadcast waves;
   second high-frequency pickup means mounted at a second marginal edge portion of the vehicle body, the second marginal edge portion being spaced apart from the first marginal edge portion, for receiving broadcast waves by detecting high-frequency currents induced on the vehicle body by the broadcast waves; and
   pickup selection means for switchably selecting an output from any one of said first and second high-frequency pickup means, said pickup selection means comparing the selected output to a predetermined threshold limit and switching to the other output of said first and second high frequency pickup means when the selected output is lower than the predetermined threshold;

said first and second high-frequency pickup means being, respectively, mounted on any one of a trunk lid and engine hood of the vehicle body, with a predetermined spacing between marginal edge portions thereof and with a predetermined spacing between said first and second high-frequency pickup means or alternatively mounted respectively on the marginal edge portions of the trunk lid and engine hood, 27. A diversity type automobile vehicle antenna system comprising:

first high-frequency pickup means mounted at a first marginal edge portion of the vehicle body for receiving broadcast waves by detecting high-frequency currents induced on the vehicle body by the broadcast waves;

second high-frequency pickup means mounted at a second marginal edge portion of the vehicle body, the second marginal edge portion being spaced apart from the first marginal edge portion, for receiving broadcast waves by detecting high-frequency currents induced on the vehicle body by the broadcast waves; and pickup selection means for switchably selecting an output from any one of said first and second high-frequency pickup means, said pickup selection means comparing the selected output to a predetermined threshold limit and switching to the other output of said first and second high frequency p;pickup means when the selected output is lower than the predetermined threshold;

said first and second high-frequency pickup means being mounted on marginal edge portions of the vehicle body, at different locations, thereof and extending parallel to the marginal edge portions of the vehicle body.

* * * * *